US009182783B2

(12) United States Patent
Wada

(10) Patent No.: US 9,182,783 B2
(45) Date of Patent: Nov. 10, 2015

(54) SYNCHRONIZATION APPARATUS AND FIELD DEVICE

(71) Applicant: Yokogawa Electric Corporation, Musashino-shi, Tokyo (JP)

(72) Inventor: Masami Wada, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 358 days.

(21) Appl. No.: 13/845,804

(22) Filed: Mar. 18, 2013

(65) Prior Publication Data

US 2013/0254582 A1    Sep. 26, 2013

(30) Foreign Application Priority Data

Mar. 23, 2012   (JP) .................................. 2012-068040

(51) Int. Cl.
| | |
|---|---|
| *G06F 1/04* | (2006.01) |
| *G06F 1/12* | (2006.01) |
| *G06F 15/16* | (2006.01) |
| *G01F 1/66* | (2006.01) |

(52) U.S. Cl.
CPC .. *G06F 1/12* (2013.01); *G01F 1/66* (2013.01); *G05B 2219/1211* (2013.01); *G05B 2219/13063* (2013.01); *G05B 2219/25472* (2013.01)

(58) Field of Classification Search
CPC ........................................................ G06F 1/12
See application file for complete search history.

(56) References Cited

U.S. PATENT DOCUMENTS

| | | | | |
|---|---|---|---|---|
| 6,239,635 | B1* | 5/2001 | Matsuzaki ..................... | 327/160 |
| 6,611,051 | B2* | 8/2003 | Akiyama et al. .............. | 257/685 |
| 6,614,814 | B1* | 9/2003 | Nimoda ........................ | 370/537 |
| 2004/0227651 | A1* | 11/2004 | Furuichi ....................... | 341/120 |
| 2004/0268173 | A1 | 12/2004 | Cheung et al. | |
| 2009/0279572 | A1* | 11/2009 | Takada et al. ................. | 370/503 |
| 2012/0051479 | A1* | 3/2012 | Liu et al. ....................... | 375/371 |

FOREIGN PATENT DOCUMENTS

| | | | |
|---|---|---|---|
| JP | 03-296340 | A | 12/1991 |
| JP | 07-296288 | A | 11/1995 |
| JP | 08-316949 | A | 11/1996 |
| JP | 2001-339374 | A | 12/2001 |
| JP | 2003-146451 | A | 5/2003 |
| JP | 2010-134752 | A | 6/2010 |

* cited by examiner

*Primary Examiner* — Mohammed Rehman
(74) *Attorney, Agent, or Firm* — Sughrue Mion, PLLC

(57) ABSTRACT

A synchronization apparatus synchronizing an operation of a first processing unit pre-processing an input signal and an operation of a second processing unit post-processing on signal from the first processing unit, may include: a counting unit that operates with a period sufficiently shorter than a period of a first reference signal governing timing of pre-processing in the first processing unit, and outputting, when counting a set target count value, a second reference signal governing timing of post-processing in the second processing unit; a phase control unit that generates a control value controlling a phase difference of the second reference signal with respect to the first reference signal in accordance with a count value when the first reference signal is input; and a filter unit that filters the generated control value so as to determine the target count value to be set in the counting unit.

17 Claims, 15 Drawing Sheets

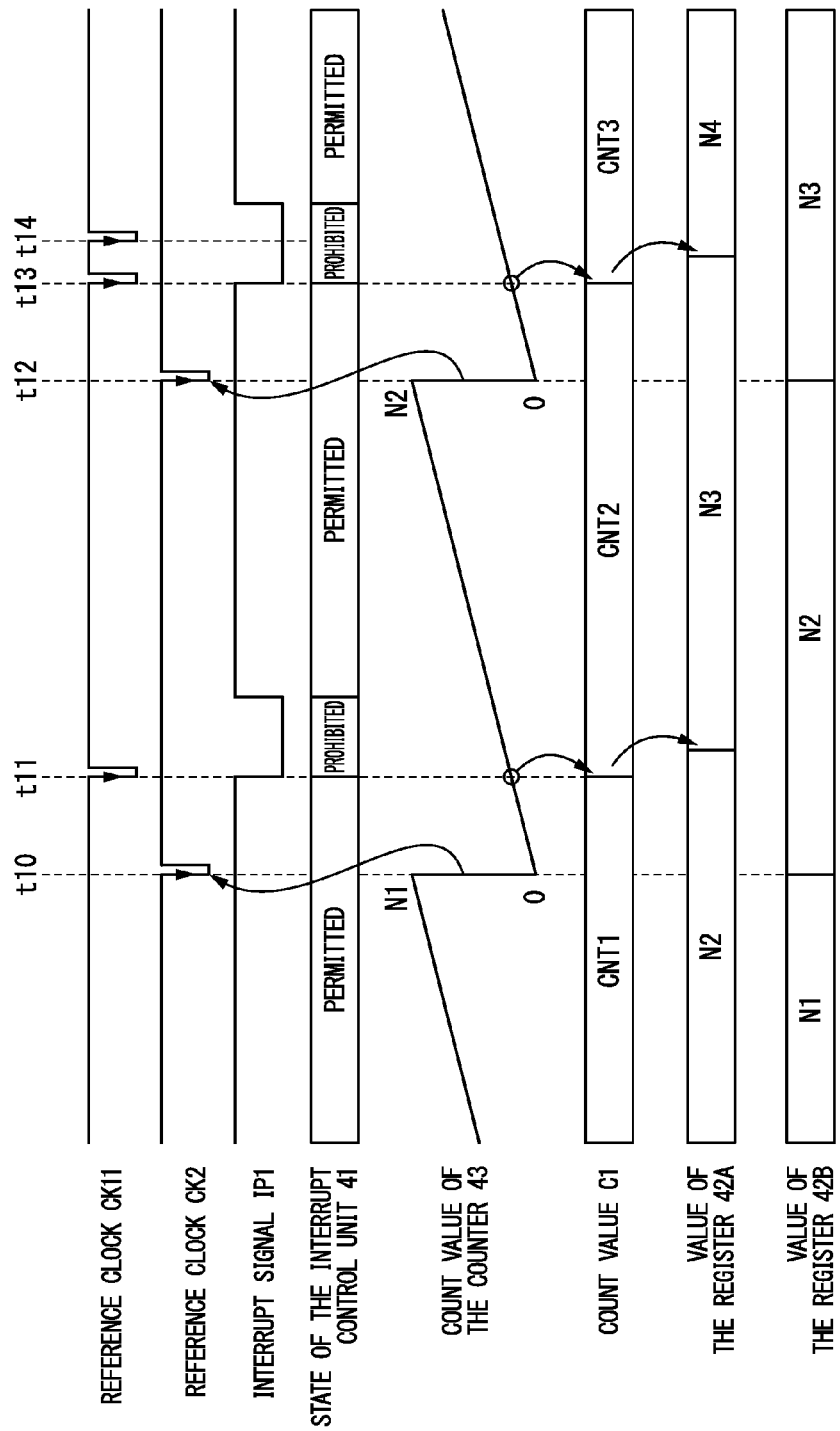

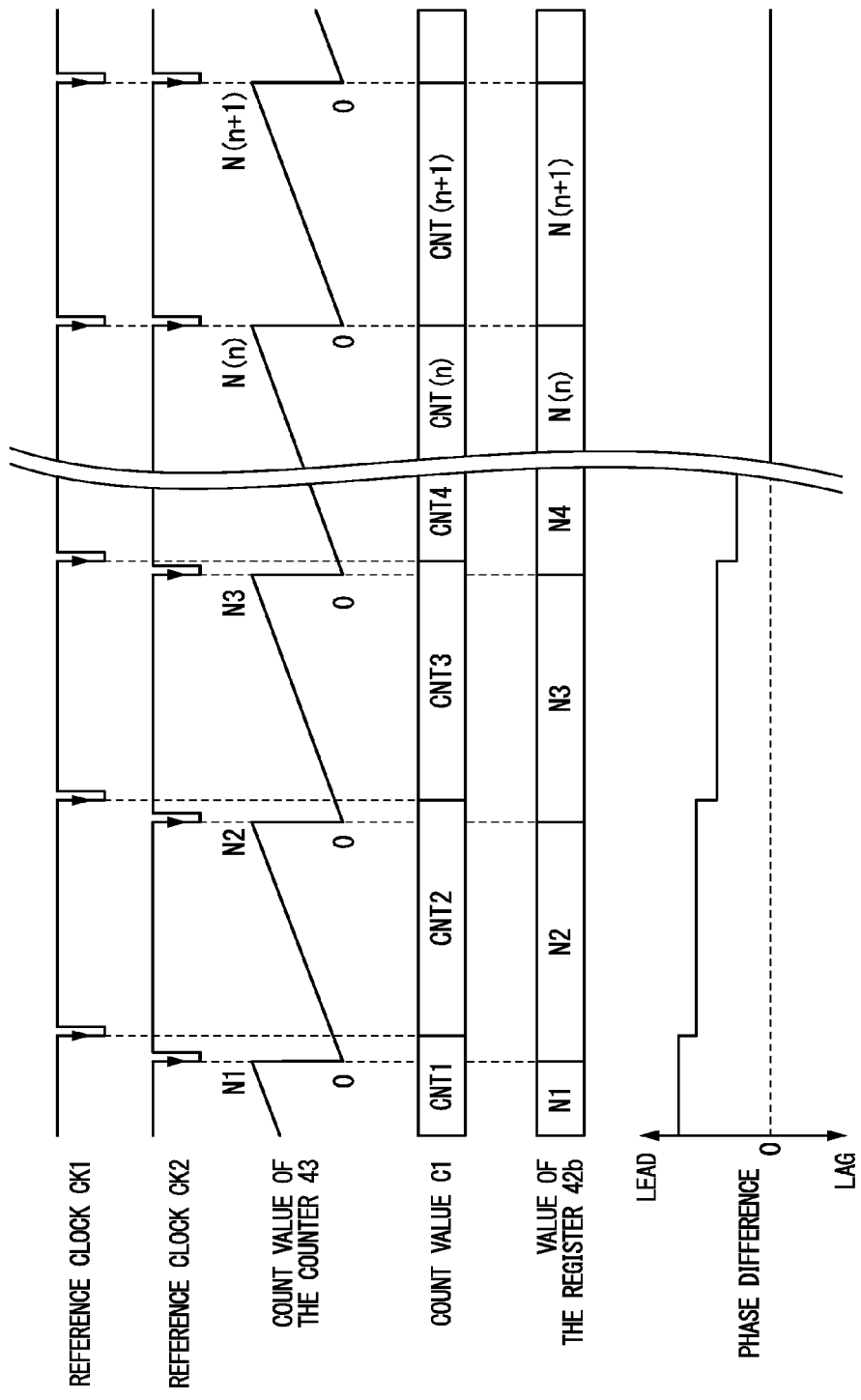

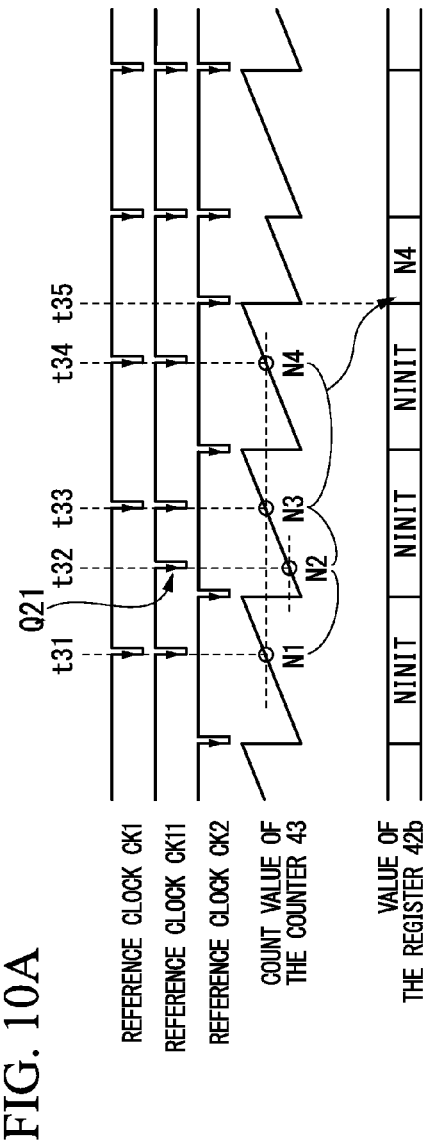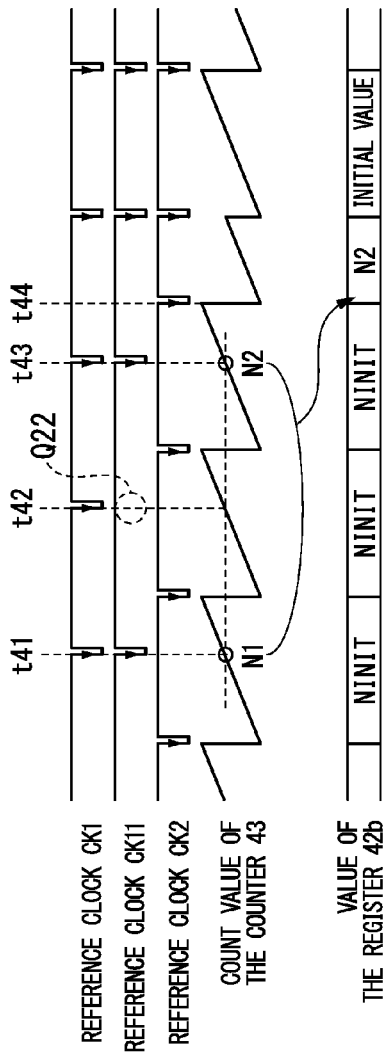
FIG. 10A
FIG. 10B

SYNCHRONIZATION APPARATUS AND FIELD DEVICE

BACKGROUND OF THE INVENTION

1. Field of the Invention

The present invention relates to a synchronization apparatus that synchronizes the operation of a plurality of processing units performing signal processing, and to a field device having the apparatus.

Priority is claimed on Japanese Patent Application No. 2012-068040, filed Mar. 23, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in order to implement a high level of automated operation in plants, factories, and the like, distributed control systems (DCSs) have been implemented, in which on-site equipment (measuring instruments and actuators) known as field devices are connected to controllers that control the field devices via a communication means. In these distributed control systems, measurement data such as flow amount, pressure, temperature, humidity (physical quantities) measured by the field devices are collected by the controllers and the field devices are operated (controlled) by the controllers in response to the collected measurement data, thereby adjusting the flow amount and the like.

Of the above-noted field devices, the field devices that can measure flow amount and the like, are generally are constituted so as to have a detection unit that detects a fluid or the like, a signal processing unit that subjects the detection signal from the detection unit to signal processing to determines the flow amount or the like, and an output unit that outputs to the outside as measurement data the result of the processing by the signal processing unit. The above-noted signal processing unit is often divided into a pre-established processing unit that subjects the detection signal from the detection unit to pre-processing such as filtering, and a post-processing unit that subjects the signal processed by the pre-processing unit to post-processing to determine the flow amount or the like, and that also controls the output unit.

A conventional field device is generally an analog transmission type in which an output unit is connected to an analog transmission line (for example a transmission line used to transmit a 4 to 20 mA signal), converts the processing results from the signal processing unit to an analog signal and outputs the analog signal to the analog transmission line. In contrast, in recent years, hybrid transmission type (smart transmission type) field devices that can superimpose a digital signal onto an analog signal, and transmit the analog signal and the digital signal on an analog transmission line have come into use. Japanese Unexamined Patent Application, First Publication No. 2010-134752 discloses a field device capable of switching between analog transmission and hybrid transmission.

In a field device, because the detection unit is electrically connected to the object under detection (for example, a fluid or a pipe through which a fluid flows), electrical insulation is required between the output unit that is connected to an external apparatus (for example, a controller) and the detection unit. In a field device of the analog transmission type described above, because an analog signal responsive to the processing result of the signal processing unit (post-processing unit) is merely output from the output unit to the analog transmission line, there is almost always electrical insulation between the signal processing unit (post-processing unit) and the output unit.

In contrast to this, a field device of the hybrid transmission type described above superimposes a digital signal onto an analog signal responsive to the processing result of the signal processing unit (post-processing unit) and outputs the result. For this reason, in a field device of the hybrid transmission type, if electrical insulation is provided between the signal processing unit (post-processing unit) and the output unit, it is necessary to insulate not only the path via which the processing result of the signal processing unit (post-processing unit) is input to the output unit, but also the path via which the digital signal (digital signal that is superimposed onto the analog signal) is input to the output unit, and there is the problem of an increase in cost.

Given this, in the above-described hybrid transmission type field device, it can be envisioned that the above-described increase in cost will not occur if the electrical insulation is provided between the pre-processing and post-processing units of the signal processing unit. In a field device, however, it is necessary synchronize the detection of the fluid in the detection unit, the signal processing in the signal processing unit, and the output in the output unit with the timing of the measuring the flow amount or the like. If the pre-processing and post-processing units of the signal processing unit are electrically insulated, there is the problem of noise intruding via the insulation circuit, or drop-out of the signal occurring in the insulation circuit causing a worsening of the accuracy of synchronization between the pre-processing and post-processing units of the signal processing unit. These problems occur not only when the pre-processing unit and the post-processing unit are connected via an insulation circuit, but also when connection is made via a connection line such as a transmission line onto which the superimposition of noise or signal drop-out can occur.

SUMMARY

A synchronization apparatus synchronizing an operation of a first processing unit that performs a pre-processing on an input signal and an operation of a second processing unit that performs a post-processing on a signal from the first processing unit, may include: a counting unit configured to operate with a period that is sufficiently shorter than a period of a first reference signal that governs a timing of the pre-processing in the first processing unit, and outputting, when it has counted a target count value that has been set, a second reference signal that governs a timing of the post-processing in the second processing unit; a phase control unit configured to generate a control value for controlling a phase difference of the second reference signal with respect to the first reference signal in accordance with a count value of the counting unit when the first reference signal is input; and a filter unit configured to filter the control value that has been generated by the phase control unit so as to determine the target count value to be set in the counting unit.

The filter unit may determine, as the target count value to be set in the counting unit, a value that causes the phase difference of the second reference signal with respect to the first reference signal to gradually approach to a pre-established phase difference.

The synchronization apparatus may further include: a startup control unit that, when a difference between a first count value, which is a count value of the counting unit when the first reference signal is input, and a second count value, which is a count value of the counting unit when the first reference signal is next input, is smaller than a pre-established threshold, sets the second count value to the target count value of the counting unit.

The synchronization apparatus may further include: a first insulation circuit configured to electrically insulate between the first processing unit and the second processing unit; and a second insulating circuit configured to electrically insulate between a generation circuit generating the first reference signal and the synchronization apparatus.

The synchronization apparatus may be connected to a connection line that connects the first processing unit and the second processing unit, and the first processing unit, when the first reference signal is input, may transmit pre-established synchronization data to the synchronization apparatus via the connection line.

The first insulation circuit and the second insulating circuit may share a common circuit.

The first insulation circuit and the second insulating circuit may be separated.

A field device having a detection unit configured to detect a physical quantity, performing signal process with respect to a detection signal output from the detection unit, and determining the physical quantity detected by the detection unit; may include: a first processing unit configured to perform a pre-processing on the detected signal output from the detection unit; a second processing unit configured to perform a post-processing on a signal from the first processing unit; and a synchronization apparatus synchronizing an operation of the first processing unit and an operation of the second processing unit. The synchronization apparatus may include: a counting unit configured to operate with a period that is sufficiently shorter than a period of a first reference signal that governs a timing of the pre-processing in the first processing unit, and outputting, when it has counted a target count value that has been set, a second reference signal that governs a timing of the post-processing in the second processing unit; a phase control unit configured to generate a control value for controlling a phase difference of the second reference signal with respect to the first reference signal in accordance with a count value of the counting unit when the first reference signal is input; and a filter unit configured to filter the control value that has been generated by the phase control unit so as to determine the target count value to be set in the counting unit.

The filter unit may determine, as the target count value to be set in the counting unit, a value that causes the phase difference of the second reference signal with respect to the first reference signal to gradually approach to a pre-established phase difference.

The field device may further include: a startup control unit that, when a difference between a first count value, which is a count value of the counting unit when the first reference signal is input, and a second count value, which is a count value of the counting unit when the first reference signal is next input, is smaller than a pre-established threshold, sets the second count value to the target count value of the counting unit.

The field device may further include: a first insulation circuit configured to electrically insulate between the first processing unit and the second processing unit; and a second insulating circuit configured to electrically insulate between a generation circuit generating the first reference signal and the synchronization apparatus.

The synchronization apparatus may be connected to a connection line that connects the first processing unit and the second processing unit, and the first processing unit, when the first reference signal is input, may transmit pre-established synchronization data to the synchronization apparatus via the connection line.

The first insulation circuit and the second insulating circuit may share a common circuit.

The first insulation circuit and the second insulating circuit may be separated.

The field device may further include the generation circuit.

A synchronization method for synchronizing an operation of a first processing unit that performs a pre-processing on an input signal and an operation of a second processing unit that performs a post-processing on a signal from the first processing unit, may include: operating with a period that is sufficiently shorter than a period of a first reference signal that governs a timing of the pre-processing in the first processing unit, and outputting, when counting a target count value that has been set, a second reference signal that governs a timing of the post-processing in the second processing unit; generating a control value for controlling a phase difference of the second reference signal with respect to the first reference signal in accordance with a count value when the first reference signal is input; and filtering the control value that has been generated so as to determine the target count value to be set.

The synchronization method may further include: determining, as the target count value to be set, a value that causes the phase difference of the second reference signal with respect to the first reference signal to gradually approach to a pre-established phase difference.

The synchronization method may further include: when a difference between a first count value, which is a count value when the first reference signal is input, and a second count value, which is a count value when the first reference signal is next input, is smaller than a pre-established threshold, setting the second count value to the target count value.

The first processing unit and the second processing unit may be electrically insulated, and a generation circuit generating the first reference signal and a synchronization apparatus may be electrically insulated.

The synchronization method may further include: when the first reference signal is input, transmitting pre-established synchronization data via a connection line that connects the first processing unit and the second processing unit.

BRIEF DESCRIPTION OF THE DRAWINGS

The above features and advantages of the present invention will be more apparent from the following description of certain preferred embodiments taken in conjunction with the accompanying drawings, in which:

FIG. 3 is a timing diagram describing the operation of the field device in accordance with the first preferred embodiment of the present invention;

FIG. 4 is a diagram illustrating the condition of the synchronization of the reference clocks in accordance with the first preferred embodiment of the present invention;

FIG. 10A and FIG. 10B are timing diagrams illustrating the operation when there is noise intrusion at the startup time in accordance with the second preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A synchronization apparatus and field device in accordance with preferred embodiments of the present invention will be described below in detail, with references made to the drawings. In the following, as an aid to understanding, the description will be of an example in which the field device is a flow gauge measuring the flow amount of a fluid flowing within a pipe. In addition to application to a field device that measures the flow amount, however, the present invention can be applied to field devices that measure physical quantities such as pressure, temperature, humidity, and the like.

First Preferred Embodiment

Figure 1:
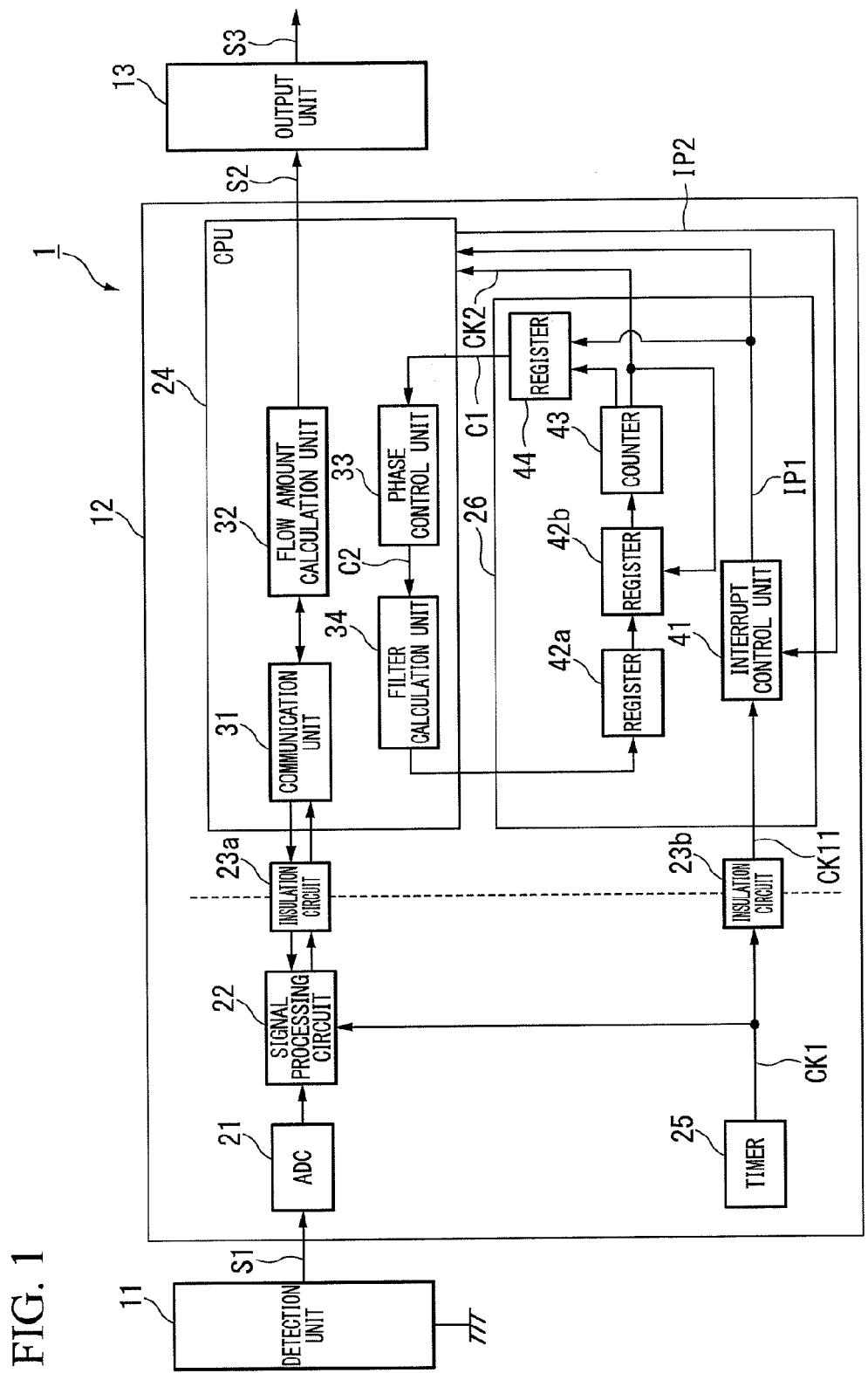
FIG. 1 is a block diagram illustrating the constitution of the main parts of a field device in accordance with the first preferred embodiment of the present invention.

FIG. 1 is a block diagram illustrating the constitution of the main parts of a field device in accordance with the first preferred embodiment of the present invention. As shown in FIG. 1, a field device 1 of the first preferred embodiment has a detection unit 11, a signal processing unit 12, and an output unit 13, measures the flow amount of a fluid (not shown) within a pipe, and outputs a measurement signal S3 that indicates the measurement result.

The detection unit 11 is mounted to the pipe in which the object-under-detection flows and, under the control of the CPU 24 provided in the signal processing unit 12, performs the detection necessary to measure the flow amount of the fluid in the pipe. For example, the passed signal when an ultrasonic wave signal is transmitted along the direction of flow of a fluid (the ultrasonic wave signal that has passed through the fluid) and the passed signal when an ultrasonic wave signal is transmitted in the direction opposite to the flow of the fluid are detected, and each of the detected results are output as a detection signal S1. The detection unit 11, because it is electrically connected to the fluid or to the pipe through which the fluid flows, is electrically grounded.

The signal processing unit 12 has an ADC (analog-to-digital converter) 21, a signal processing circuit 22 (first processing unit), an insulation circuit 23a (first insulation circuit), an insulation circuit 23b (second insulation circuit), a CPU (central processing unit) 24, a timer 25 (generation circuit), and a synchronization circuit 26, performs signal processing with respect to the detection signal S1 from the detection unit 11, determines the flow amount of the fluid flowing in the pipe, and outputs a flow amount signal S2 indicating the flow amount. In this case, in the signal processing unit 12, the insulation circuits 23a and 23b electrically insulate the ADC 21, the signal processing circuit 22, and the timer 25 from the CPU 24 and the synchronization circuit 26. This is because it is necessary to electrically insulate the detection unit 11, which is grounded, from the output unit 13, without causing an increase in cost. A combination of the CPU 24 and the synchronization circuit 26 may be referred to as a synchronization apparatus.

The ADC 21 converts the detection signal S1 (an analog signal) output from the detection unit 11 to a digital signal. The signal processing circuit 22 pre-processes the signal output from the ADC 21 necessary for determining the flow amount of the fluid. For example, processing is performed which determines the difference between the propagation time of the ultrasonic wave signal when an ultrasonic wave signal is transmitted and received in the direction along the flow of the fluid, and the propagation time of the ultrasonic wave signal when an ultrasonic wave signal is transmitted and received in the direction opposite the flow of the fluid. The signal processing circuit 22 performs the above-noted pre-processing at the timing of a reference clock CK1 (first reference signal) being input from the timer 25.

The insulation circuit 23a is provided between the signal processing circuit 22 and the CPU 24, and provides electrical insulation therebetween. Specifically, one end of the insulation circuit 23a is connected to the other end of a serial bus connected to the signal processing circuit 22, and the other end of the insulation circuit 23a is connected to the other end of a serial bus connected to the CPU 24, and by electrically insulating these serial buses, electrical insulation is provided between the signal processing circuit 22 and the CPU 24. Also, the above-noted serial buses are UARTs (universal asynchronous receiver transmitters), I²C (registered trademark) (Inter-Integrated Circuit) buses, SPI (registered trademark) (Serial Peripheral Interface) buses or the like. The insulation circuit 23b is provided between the timer 25 and the synchronization circuit 26, and provides electrical insulation therebetween. Photocouplers, for example, can be used as the insulation circuits 23a and 23b.

The CPU 24 determines the flow amount of the fluid using the pre-processing results of the signal processing circuit 22, and also performs overall control of the operation of the field device 1. A communication unit 31, a flow amount calculation unit 32 (second processing unit), a phase control unit 33, and a filter calculation unit 34 (filter unit) are implemented in the CPU 24. These are implemented by the CPU 24 reading out and executing a program stored in a non-illustrated memory.

The communication unit 31 communicates (by serial communication) with the signal processing circuit 22 via the insulation circuit 23a. The flow amount calculation unit 32 post-processes the signal from the signal processing circuit 22 (signal via the insulation circuit 23a and the communication unit 31) to determine the flow amount of the fluid, and outputs the flow amount signal S2 indicating the flow amount. For example, the flow amount calculation unit 32 performs processing (calculation) to determine the average flow rate of the fluid flowing in the pipe from the pre-processing results of the signal processing circuit 22 and perform processing (calculation) to multiply the determined average flow rate by the cross-sectional area of the pipe, so as to determine the amount of flow of the fluid. The flow amount calculation unit 32 performs the above-noted post-processing at the timing of the input of a reference clock CK2 (second reference signal) from the synchronization circuit 26.

The phase control unit 33, in accordance with the count value C1 output from the synchronization circuit 26, generates a control value C2 for the purpose of controlling the phase difference of the reference clock CK2 (the reference clock that governs the timing of the post-processing in the flow amount calculation unit 32) with respect to the reference clock CK1 (reference clock that governs the timing of the pre-processing in the signal processing circuit 22). In this case, the count value C1 output from the synchronization circuit 26 indicates the phase difference between the reference clock CK1 and the reference clock CK2.

Figure 2:
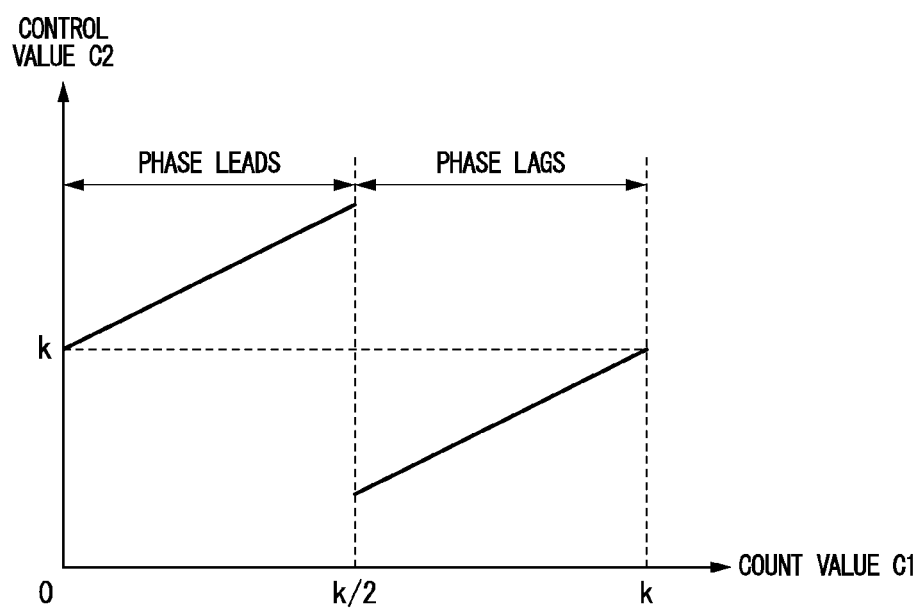
FIG. 2 is a diagram illustrating the input/output relationship of the phase control unit in accordance with the first preferred embodiment of the present invention.

FIG. 2 is a diagram illustrating the input/output relationship of the phase control unit in accordance with the first preferred embodiment of the present invention. In FIG. 2, the horizontal axis represents the count value C1 from the synchronization circuit 26, and the vertical axis represents the control value C2 output from the phase control unit 33. The value k in FIG. 2 is a value that is established by the length of one period of the reference clock CK1 that governs the timing of the pre-processing in the signal processing circuit 22 and the operating period of the counter 43 (details of which will be described later) of the synchronization circuit 26. Specifically, the value k is the count value that is counted by the counter 43 during one period of the reference clock CK1.

As shown in FIG. 2, the phase control unit 33 outputs the control value C2 that becomes k if the count value C1 output from the synchronization circuit 26 is zero, and that gradually increases as the count value C1 increases from zero to k/2. Also, the phase control unit 33 outputs the control value C2 that becomes k if the count value C1 output from the synchronization circuit 26 is k, and that gradually decreases as the count value C1 decreases from k to k/2. When the count value C1 is between zero and k/2, the phase of the reference clock CK2 leads with respect to the reference clock CK1, and when the count value is between k and k/2, the phase of the reference clock CK2 lags with respect to the reference clock CK1.

The filter calculation unit 34 performs filtering (for example, lowpass filtering with the time constant set to approximately 10 s) of the control value C2 output from the phase control unit 33. In this case, lowpass filtering is provided in the filter calculation unit 34 and performed with respect to the control value C2 because if there is an offset from the pre-established phase difference between the reference clocks CK1 and CK2 (zero in the first preferred embodiment), it gradually eliminates the offset (that is, gradually approaches the pre-established phase difference). Although details will be described later, the output value of the filter calculation unit 34 is used as the target count value, in which the counter 43 provided in the synchronization circuit 26 is to count.

The timer 25 outputs the reference clock CK1 that governs the timing of the pre-processing in the signal processing circuit 22. Specifically, the timer 25 outputs a reference clock CK1 with a period of, for example, approximately 10 to 100 ms. The synchronization circuit 26 has an interrupt control unit 41, registers 42a and 42b, the counter 43 (counting unit), and a register 44 and, using the reference clock CK1 via the insulation circuit 23a, generates the reference clock CK2 and synchronizes the operation of the signal processing circuit 22 and the flow amount calculation unit 32.

In this case, the reference clock CK1 output from the timer 25 might be mixed with noise or exhibit drop-outs because of passing through the insulation circuit 23b. For this reason, in the following, to distinguish from the reference clock CK1 output from the timer 25, the clock that might be mixed with noise or exhibit drop-outs via the insulation circuit 23b will be referred to as the reference clock CK11.

The interrupt control unit 41 performs interrupt control with respect to the CPU 24, based on the reference clock CK11. Specifically, if the reference clock CK11 is input, the interrupt control unit 41 outputs an interrupt signal IP1 to the CPU 24, and prohibits an interrupt by the reference clock CK11 for a certain period of time. In this case, an interrupt by the reference clock CK11 is prohibited during the period up until the interrupt clear signal IP2 is output from the CPU 24. The time from the input of the interrupt signal IP1 from the interrupt control unit 41 until the interrupt clear signal IP2 is output can be arbitrarily set.

The register 42a temporarily holds the value output from the filter calculation unit 34 of the CPU 24. The register 42b holds the target count value that is to be counted by the counter 43. Specifically, at the timing of the output of the reference clock CK2 from the counter 43, the register 42b captures and holds as the target count value the value held in the register 42a.

The counter 43 operates with a period that is sufficiently shorter than the period of the reference clock CK1 and, when it has counted the target count value held in the register 42b, it outputs the reference clock CK2 that governs the timing of the post-processing in the flow amount calculation unit 32 of the CPU 24. When the counter 43 has counted the target count value, it clears the count value, captures the target count value from the register 42b, and starts counting. The counter 43, for example, performs counting operation with a period of approximately 1 to 10 µs. The register 44 captures and holds and also outputs as the count value C1 the count value of the counter 43 when the interrupt signal IP1 is output from the interrupt control unit 41.

The output unit 13 is connected to an analog transmission line (transmission line, for example, using 4 to 20 mA signal transmission), converts the flow amount signal S2 output from the flow amount calculation unit 32 of the signal processing unit 12 to an analog signal and outputs it to the analog transmission line. The output unit 13 may output only an analog signal, or may output a digital signal superimposed onto an analog signal.

Next, the operation of the field device 1 having the above-noted constitution will be described. FIG. 3 is a timing diagram describing the operation of the field device in accordance with the first preferred embodiment of the present invention.

First, when the detection unit 11 is controlled by the CPU 24 provided in the signal processing unit 12, the detection unit 11 detects a fluid flowing in a pipe, and the detection signal S1 is output from the detection unit 11. Specifically, the passed signal when an ultrasonic wave signal is transmitted along the direction of flow of the fluid and the passed signal when an ultrasonic wave signal is transmitted in the direction opposite to the flow of the fluid are detected, and each of the detected results are sequentially output as the detection signal S1.

The detection signals S1 output from the detection unit 11 are converted to digital signals by the ADC 21 of the signal processing unit 12, are sequentially input to the signal processing circuit 22, and are subjected to pre-processing at the timing of the input of the reference clock CK1 from the timer 25. Specifically, at the timing of the reference clock CK1, processing is performed that determines the difference in the propagation time of the ultrasonic wave signal when an ultrasonic wave signal is transmitted and received in the direction along the flow of the fluid, and the propagation time of the ultrasonic wave signal when an ultrasonic wave signal is transmitted and received in the direction opposite the flow of the fluid.

The signal that has been pre-processed by the signal processing circuit 22 is received by the communication unit 31 of the CPU 24 via the insulation circuit 23a, is input to the flow amount calculation unit 32, and is subjected to post-processing at the timing of the input of the reference clock CK2 from the synchronization circuit 26. Specifically, at the timing of the reference clock CK2, the average flow rate of the fluid flowing in the pipe is determined from the pre-processing results of the signal processing circuit 22, and processing is performed on the average flow rate to multiply the average flow rate by the cross-sectional area of the pipe, so as to determine the amount of flow of the fluid. When the amount of flow of the fluid is determined, the flow amount signal S2 is output to the output unit 13 from the flow amount calculation unit 32. The flow amount signal S2 is converted to an analog signal in the output unit 13, and is output as the measurement signal S3 to the analog transmission line.

The reference clock CK1 that governs the timing of the pre-processing in the above-described signal processing circuit 22 is output from the timer 25 with a certain period (for example, a period of approximately 10 to 100 ms). In contrast, the reference clock CK2 that governs the timing of the post-processing in the above-described flow amount calculation unit 32 is generated by the synchronization circuit 26 based on the reference clock CK11 (the reference clock CK1 via the insulation circuit 23b). The synchronization circuit 26 controls the timing of the generation of the reference clock CK2, and synchronizes the operation of the signal processing circuit 22 and the operation of the flow amount calculation unit 32. The operation of the synchronization circuit 26 is described in detail below.

As shown in FIG. 3, in the synchronization circuit 26 the operation of the counter 43 counting the target count value held in the register 42b is repeatedly performed. At time t11, when the reference clock CK11 is input to the synchronization circuit 26, the interrupt signal IP1 is output to the CPU 24 from the interrupt control unit 41, the count value CNT2 of the counter 43 at the point in time when the interrupt signal IP1 is output and being held in the register 44 is output to the CPU 24 as the count value C1. When the interrupt signal IP1 is output, the interrupt control unit 41 is in the state in which interrupt by the reference clock CK11 is prohibited until the interrupt clear signal IP2 is input from the CPU 24.

When the count value C1 from the synchronization circuit 26 is input to the CPU 24, a control value C2 is output in accordance with the count value C1 from the phase control unit 33. In this case, the count value CNT2 that is output as the count value C1 from the synchronization circuit 26 at time t11 indicates the phase difference between the reference clock CK2 output from the synchronization circuit 26 at time t10 and the reference clock CK11 input to the synchronization circuit 26 at time t11 and, as shown in FIG. 3, the phase of the reference clock CK2 leads the phase of the reference clock CK11. For this reason, a control value C2 that is larger than the value k in FIG. 2 and that makes period of the reference clock CK2 long is output from the phase control unit 33.

When the above-noted control value C2 is output from the phase control unit 33, the filter calculation unit 34 filters the control value C2 (for example, lowpass filtering with a time constant of approximately 10 s). The value obtained by the filtering in the filter calculation unit 34 is temporarily held in the register 42a of the synchronization circuit 26. In the example shown in FIG. 3, the value N3 is held in the register 42a.

If the counting by the counter 43 of the target count value (the value N2 in the example shown in FIG. 3) stored in the register 42b is taken to be completed at time t12, the reference clock CK2 is output from the counter 43 to the CPU 24. When the reference clock CK2 is input to the CPU 24, the above-described post-processing is performed in the flow amount calculation unit 32. When the reference clock CK2 is output from the counter 43, the value held in the register 42a (the value N3 in the example shown in FIG. 3) is captured into and held in the register 42b. The count value of the counter 43 is then cleared, and the counter 43 starts the operation of counting the target count value N3 held in the register 42b.

Continuing, at time t13, when the reference clock CK11 is input to the synchronization circuit 26, similar to the case in which the reference clock CK11 is input at time t11, the interrupt signal IP1 is output to the CPU 24 from the interrupt control unit 41. The count value CNT3 of the counter 43 at the point in time of the output of the interrupt signal IP1 is held in the register 44 and is also output to the CPU 24 as the count value C1.

In this case, as described above, when the interrupt control unit 41 outputs the interrupt signal IP1, the state is one in which an interrupt by the reference clock CK11 is prohibited until the interrupt clear signal IP2 is input from the CPU 24. For this reason, as shown in FIG. 3, at time t14, before the interrupt clear signal IP2 is input from the CPU 24, even if the reference clock CK11 exhibits a falling edge because of mixed noise, an interrupt thereby is prohibited.

When the count value C1 is input to the CPU 24 from the synchronization circuit 26, the control value C2 responsive to the count value C1 is output from the phase control unit 33. In this case, the count value CNT3 output as the count value C1 from the synchronization circuit 26 at time t13 indicates the phase difference between the reference clock CK2 output from the synchronization circuit 26 at time t12 and the reference clock CK11 input to the synchronization circuit 26 at time t13 and, as shown in FIG. 3, the phase of the reference clock CK2 leads the phase of the reference clock CK11. For this reason, a control value C2 that makes the period of the reference clock CK2 long is output from the phase control unit 33.

When the above-noted control value C2 is output from the phase control unit 33, the filter calculation unit 34 filters the control value C2 (for example, lowpass filtering with a time constant of approximately 10 s). The value obtained by the filtering in the filter calculation unit 34 is temporarily held in the register 42a of the synchronization circuit 26. In the example shown in FIG. 3, the value N3 is held in the register 42a.

Thereafter in the same manner, by the synchronization circuit 26 repeatedly performing control to adjust the period of the reference clock CK2, the phase of the reference clock CK2 gradually coincides with the phase of the reference clock CK11. Because the reference clock CK11 can be thought of as being the same as the reference clock CK1 if there were to be no mixture of noise or drop-outs or the like, by the above-described operation of the synchronization circuit 26 the phase of the reference clock CK2 coincides with the phase of the reference clock CK1.

FIG. 4 is a diagram illustrating the condition of the synchronization of the reference clocks in accordance with the first preferred embodiment of the present invention.

As shown in FIG. 4, a count value C1 responsive to the phase difference between the reference clock CK1 and the reference clock CK2 is output from the synchronization circuit 26, the target count value in accordance with the count value C1 is determined in the phase control unit 33 and the filter calculation unit 34 of the CPU 24, and held in the register 42b. By doing this, the period of the time of the counter 43 counting (reference clock signal CK2) is adjusted and, as shown in FIG. 4, the phase difference between the reference clock CK1 and the reference clock CK2 gradually becomes zero, so that the two coincide. By the phase of the reference clock CK1 coinciding with the phase of the reference clock CK2, the operation of the signal processing circuit 22 and the operation of the flow amount calculation unit 32 are synchronized.

As described above, in the first preferred embodiment, the phase difference between the reference clock CK11 (reference clock CK1 via the insulation circuit 23b) and the reference clock CK2 is determined from the count value of the counter 43, the control value C2 for the purpose of controlling this phase difference is generated by the phase control unit 33, lowpass filtering is done with respect to the control value C2, and the target count value of the counter 43 (value that governs the timing of the output of the reference clock CK2) is determined by the filter calculation unit 34. For this reason, it is possible to synchronize with high accuracy the signal processing circuit 22, the pre-processing timing of which is governed by the reference clock CK1, and the flow amount calculation unit 32, the post-processing timing of which is governed by the reference clock CK2, which are connected via the insulation circuit 23a.

In the first preferred embodiment, lowpass filtering is done by the filter calculation unit 34 of the control value C2 from the phase control unit 33 and the target count value to be set in the counter 43 is determined. For this reason, even if noise is mixed with the reference clock CK11 from the insulation circuit 23b or there are drop-outs or the like thereof, because the reference clock CK2 generated by the synchronization circuit 26 does not have the mixed noise or drop-outs such as in the reference clock CK11, there is no great loss of synchronization accuracy between the reference clock CK11 and the reference clock CK2.

First Variation Example

Figure 5A:
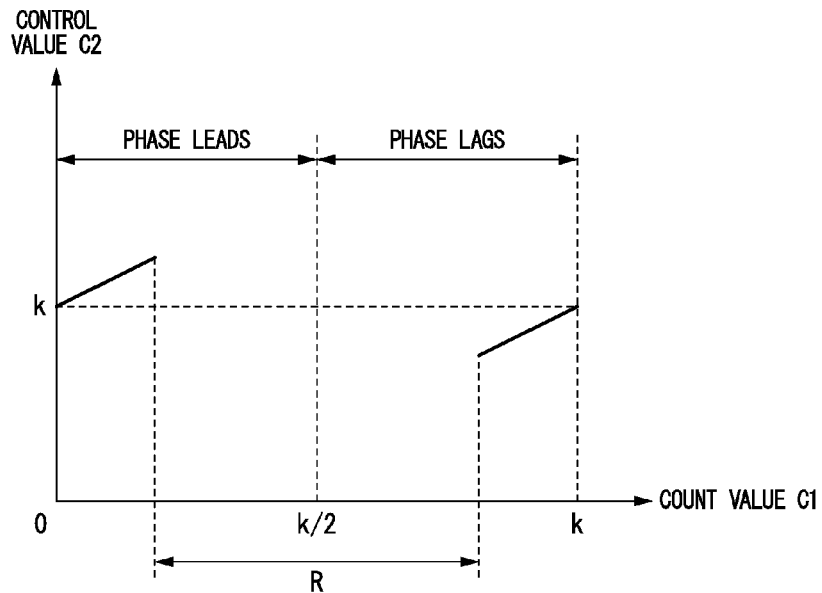
FIG. 5A and FIG. 5B describe a first variation example of a field device in accordance with the first preferred embodiment of the present invention.
Figure 5B:
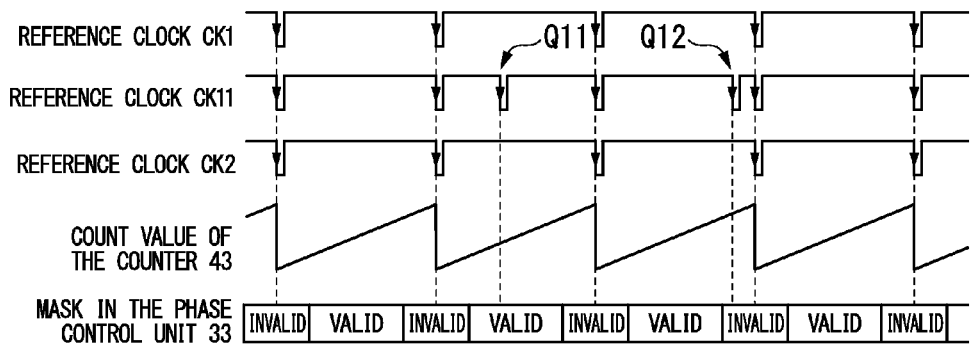

FIG. 5A and FIG. 5B describe a first variation example of a field device in accordance with the first preferred embodiment of the present invention, FIG. 5A being a drawing of the input/output relationship of the phase control unit used in the first variation example, and FIG. 5B being a timing diagram describing the operation of the field device in the first variation example. The phase control unit 33 having the input/output relationship shown in FIG. 2 outputs mutually different control values C2 with respect to each of the count values C1 output from the synchronization circuit 26. In contrast, in the first variation example, the phase control unit 33 that is used is one in which, if the count value C1 output from the synchronization circuit 26 is within a pre-established mask range (the range R shown in FIG. 5A), masks the count value C1 and does not output the control value C2.

In the steady-state condition in which the field device is operating normally, because the reference clock CK1 and the reference clock CK2 substantially coincide in phase, the count value C1 output from the synchronization circuit 26 is a value that is very close to zero or k. For this reason, if the count value C1 varies greatly from either zero or k, it can be thought that this is the influence of noise. Given this, in the first variation example, as shown in FIG. 5A, the phase control unit 33 that is used is one in which, if the count value C1 output from the synchronization circuit 26 is a value that is close to zero or k, the control value C2 is output, and if the count value C1 is a value within the mask range R, the count value C1 is masked and the control value C2 is not output.

At this point, consider the case of a reference clock CK11 (the reference clock CK1 via the insulation circuit 23b) onto which the noises Q11 and Q12 are superimposed being input to the synchronization circuit 26 as shown in FIG. 5B. An interrupt signal IP1 is output from the interrupt control unit 41 by each of the noises Q11 and Q12 superimposed onto the reference clock CK11, and the count values of the counter 43 at the points in time of the output of each of the interrupt signals IP1 are output as count values C1 to the phase control unit 33 of the CPU 24 from the synchronized circuit 26.

As shown in FIG. 5B, because the noise Q11 superimposed onto the reference clock CK11 appears on a part that is distanced from the falling edge of the reference clock CK11, the count value C1 output to the phase control unit 33 from the synchronization circuit 26, due to the noise Q11, becomes a value falling within the mask range R set in the phase control unit 33. As a result, the mask of the phase control unit 33 becomes valid, the count value C1 is masked, and the control value C2 is not output from the phase control unit 33. That is, the operation of the field device 1 is completely uninfluenced by the noise Q11.

In contrast, because the noise Q12 superimposed onto the reference clock CK11 appears on a part that is close to the falling edge of the reference clock CK11, the count value C1 output to the phase control unit 33 from the synchronization circuit 26, due to the noise Q12, becomes a value that falls outside the mask range R set in the phase control unit 33. As a result, the mask of the phase control unit 33 become invalid, the count value C1 is not masked, and a control value C2 responsive to the count value C1 is output from the phase control unit 33. In this case, although the operation of the field device 1 is somewhat influenced by the noise Q12, there is no great loss of synchronization accuracy between the reference clock CK11 and the reference clock CK2.

As described above, in the first preferred embodiment, a phase control unit 33 is used in which, if the count value C1 output from the synchronization circuit 26 is a value that is close to zero or k, the control value C2 is output and, if the count value C1 is a value falling within the mask range R, the count value C1 is masked, and the control value C2 is not output. As a result, it is possible to achieve more stable synchronization between the signal processing circuit 22, the pre-processing timing of which is governed by the reference clock CK1 and the flow amount calculation unit 32, the post-processing timing of which is governed by the reference clock CK2.

Second Variation Example

FIG. 6A, FIG. 6B, FIG. 7A, and FIG. 7B are drawings describing the second variation example of a field device in accordance with the first preferred embodiment of the present invention, drawings with the suffix A showing the input/output relationship of the phase control unit used in the second variation example, and drawings with the suffix B being timing diagrams describing the operation of the field device in the second variation example. The phase control unit 33 having the input/output relationship shown in FIG. 2 performs control to cause the reference clock CK2 to coincide with the phase of the reference clock CK1. In contrast, in the second variation example, a phase control unit 33 is used that performs control so that the reference clock CK1 and the reference clock CK2 have a pre-established phase difference.

Figure 6A:
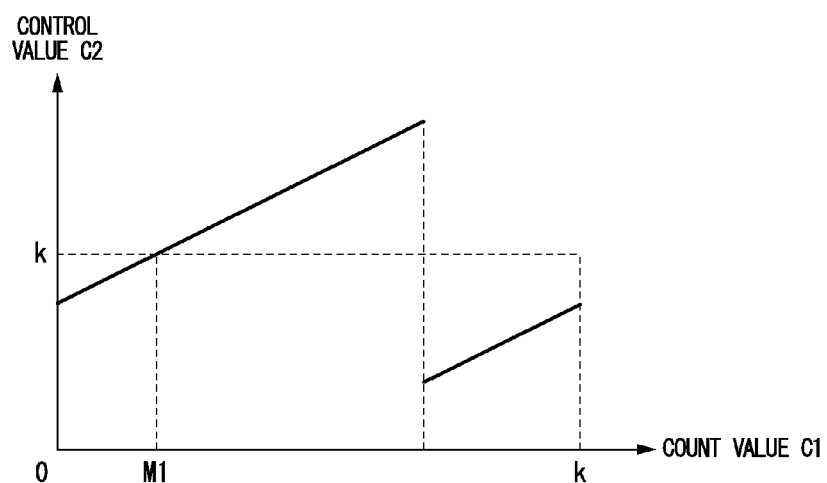
FIG. 6A, FIG. 6B, FIG. 7A, and FIG. 7B are drawings describing the second variation example of a field device in accordance with the first preferred embodiment of the present invention.
Figure 6B:
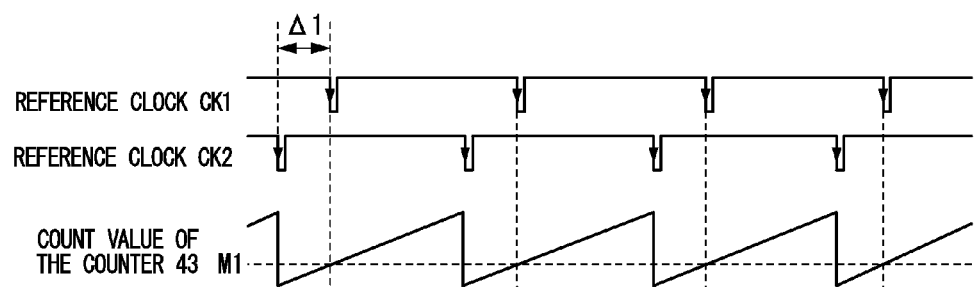

A phase control unit having the input/output relationship shown in FIG. 6A performs control so that the phase of the reference clock CK2 is made to lead that of the reference clock CK1 and so that the phase difference between the reference clock CK1 and the reference clock CK2 is Δ1. This phase control unit has an input/output relationship such that the horizontal axis in FIG. 2 is shifted to the right by an amount of the count value M1, which corresponds to the phase difference Δ1 between the reference clock CK1 and the reference clock CK2. By using the phase control unit having this input/output relationship, as shown in FIG. 6B, it is possible to synchronize the reference clock CK1 and the reference clock CK2, with the phase of the reference clock CK2 leading by the phase difference of Δ1.

Figure 7A:
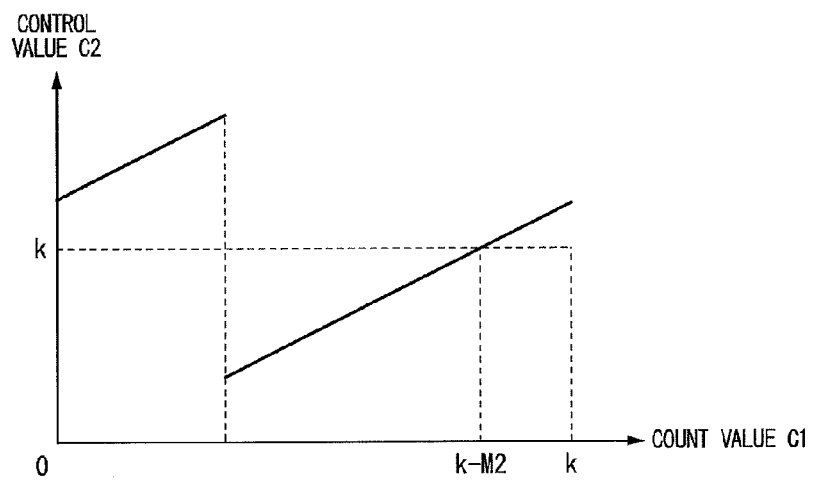
Figure 7B:
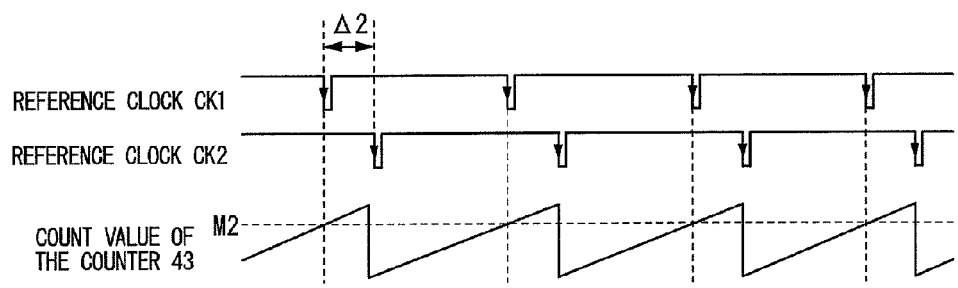

A phase control unit having the input/output relationship shown in FIG. 7A performs control so that the phase of the reference clock CK2 is made to lag that of the reference clock CK1 so that the phase difference between the reference clock CK1 and the reference clock CK2 is Δ2. This phase control unit has an input/output relationship such that the horizontal axis in FIG. 2 is shifted to the left by an amount of the count value M2, which corresponds to the phase difference Δ2 between the reference clock CK1 and the reference clock CK2. By using the phase control unit having this input/output relationship, as shown in FIG. 7B, it is possible to synchronize the reference clock CK1 and the reference clock CK2, with the phase of the reference clock CK2 lagging by the phase difference of Δ2.

Second Preferred Embodiment

Figure 8:
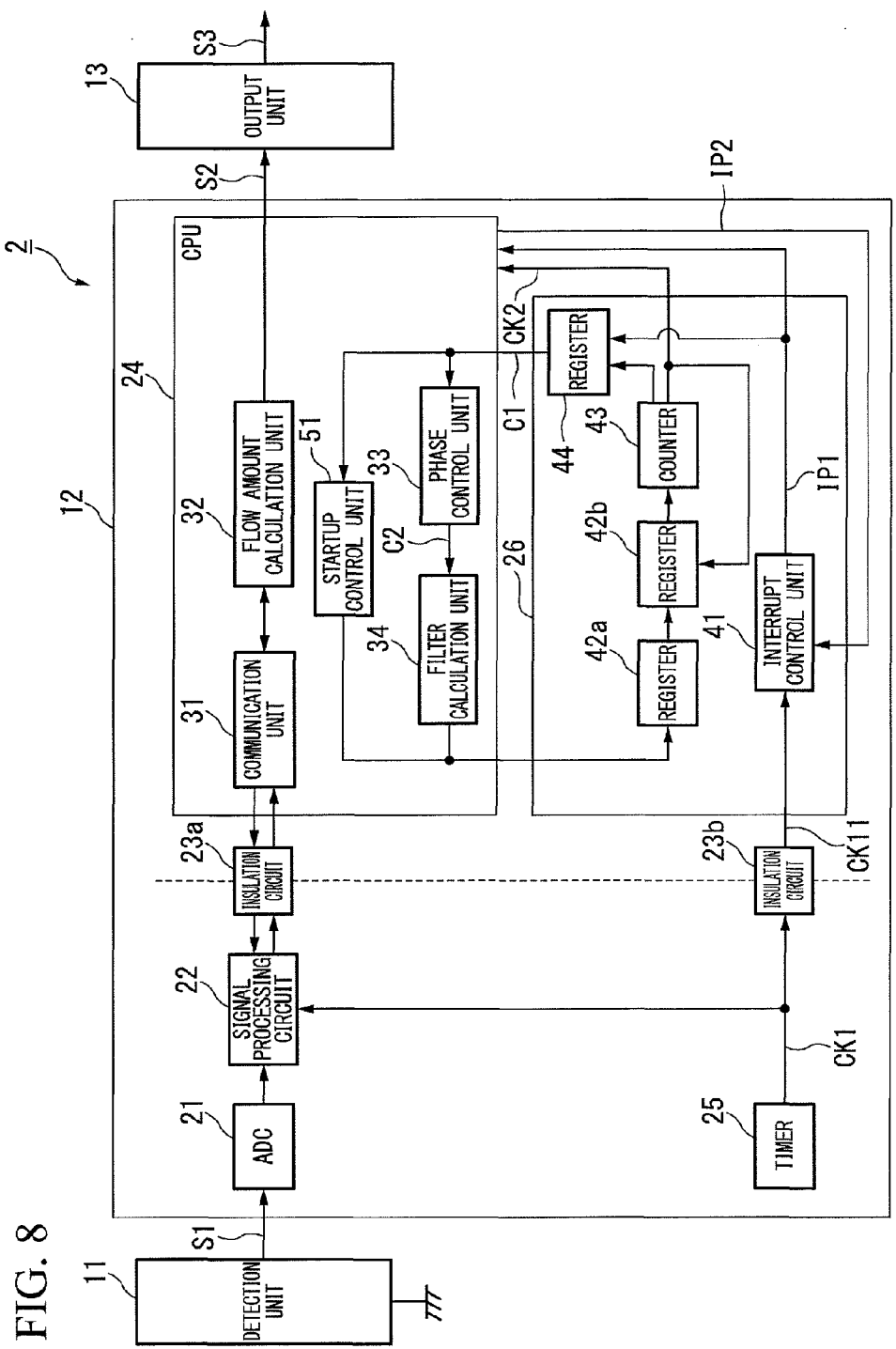
FIG. 8 is a block diagram illustrating the constitution of the main parts of a field device in accordance with the second preferred embodiment of the present invention.

FIG. 8 is a block diagram illustrating the constitution of the main parts of a field device in accordance with the second preferred embodiment of the present invention. In FIG. 8, blocks that are the same as blocks shown in FIG. 1 are assigned the same reference numerals. As shown in FIG. 8, a field device 2 of the second preferred embodiment has an additional startup control unit 51 in the CPU 24 of the field device 1 shown in FIG. 1. Also, the startup control unit 51 is implemented by reading and execution by the CPU 24 of a program stored in a non-illustrated memory.

The above-described field device 1 causes the phase of the reference clock CK1 to gradually coincide with the phase of the reference clock CK2, so as to synchronize the reference clock CK1 and the reference clock CK2. In the field device 1, if there is a large offset between the phases of the reference clock CK1 and the reference clock CK2 when the power is applied (at the time of startup), a long period of time is required before the phases of the reference clock CK1 and the reference clock CK2 coincide (until startup) (that is, before the field device has started up). The field device 2 of the second preferred embodiment shortens the amount of time until startup that costs for starting up the field device.

The startup control unit 51 determines the difference between the count value C1 (first count value) of the counter 43 when the reference clock CK11 (reference clock CK1 via the insulation circuit 23b) is input, and the count value C1 (second count value) of the counter 43 when the next reference clock CK11 is input. Then, if the difference is smaller than a pre-established threshold, control is performed to output the latter count value C1 as the target count value to the register 42a of the synchronization circuit 26. Instead of the latter count value C1, the former count value C1 may be output as the target count value.

In this case, the timer 25 has a quartz crystal unit, a ceramic resonator, or other oscillating element in order to generate the reference clock CK1. The accuracy of a general quartz crystal unit is 100 ppm (0.01%) or better. Although the phase difference between the reference clock CK1 and the reference clock CK2 at the time of the startup of the field device 2 is indefinite, if a timer 25 having a quart crystal unit is used, the periods will coincide with an accuracy within 0.02%. For this reason, in setting the above-described threshold used in the startup control unit 51, consideration is given to the initial value of the target count value held in the register 42b, the accuracy of the quartz crystal unit provided in the timer 25, and the margin.

Figure 9:
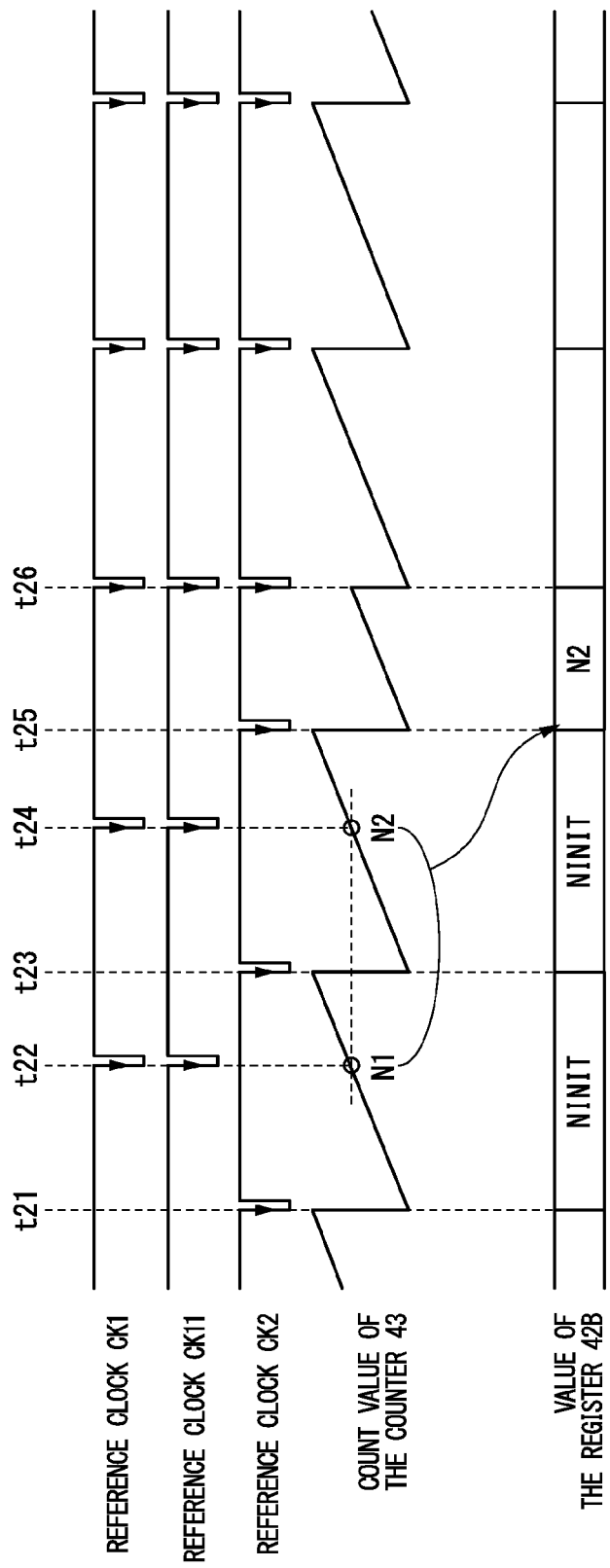
FIG. 9 is a timing diagram describing the operation of a field device in accordance with the second preferred embodiment of the present invention.

Next, the operation of the field device 2 in the above-noted constitution will be described. FIG. 9 is a timing diagram describing the operation of a field device in accordance with the second preferred embodiment of the present invention. When the field device 2 is started up, an initial value Ninit for the purpose of causing coincidence between the period of the reference clock CK2 and the period of the reference clock CK1 is output to the register 42a of the synchronization circuit 26 from the startup control unit 51. The initial value Ninit is set as the target count value into the register 42b of the synchronization circuit 26 at the end of the counting by the counter 43, and starts the counting by the counter 43 (time t21).

If the reference clock CK11 is input during counting by the counter 43, the interrupt signal IP1 is output from the interrupt control unit 41 of the synchronization circuit 26, and the count value of the counter 43 (N1 in this case) at the time of the output of the interrupt signal IP1 is input as the count value C1 to the startup control unit 51 of the CPU 24 (time t22). When the counter 43 completes counting of the above-noted initial value Ninit, the initial value Ninit output from the startup control unit 51 and held in the register 42a of the synchronization circuit 26 is captured into the register 42b, and the counter 43 starts counting (time t23).

If the reference clock CK11 is input again during counting by the counter 43, the interrupt signal IP1 is output from the interrupt control unit 41 of the synchronization circuit 26, and the count value of the counter 43 (in this case, N2) at the time of the output of the interrupt signal IP1 is input to the startup control unit 51 of the CPU 24 as the count value C1 (time t24). Then, in the startup control unit 51, the difference between the two input count values C1 (the count value N1 input at time t22 and the count value N2 input at time t24) is taken, and a judgment is made of whether or not the difference is smaller than the pre-established threshold.

In this case, if the difference between the above-noted count values N1 and N2 is judged to be smaller than the threshold, the startup control unit 51 outputs the count value N2 input at time t24 to the register 42a. If the difference between the count values N1 and N2 is judged to be equal to or greater than the threshold, the startup control unit 51 outputs the initial value Ninit to the register 42a.

If the difference between the count values N1 and N2 is judged to be smaller than the threshold, when the counter 43 finishes counting to the initial value Ninit, the value N2 held in the register 42a is captured into the register 42b, and the counter 43 starts counting (time t25). In this case, because the value N2 indicates the phase difference between the reference clock CK11 and the reference clock CK2, when the counter 43 counts to the value N2, the phases of the reference clock CK2 output from the counter 43 and the reference clock CK11 substantially coincide at the completion of counting (time t26). When the phases of the reference clock CK11 and the reference clock CK2 substantially coincide, normal control is performed by the phase control unit 33 (the control described with regard to the first preferred embodiment).

FIG. 10A and FIG. 10B are timing diagrams illustrating the operation when there is noise intrusion at the startup time in accordance with the second preferred embodiment of the present invention, FIG. 10A illustrating the operation when the noise is mixed with the reference clock, and FIG. 10B illustrating the operation when there is a reference clock drop-out. In the example shown in FIG. 10A, the noise Q21 is superimposed onto the reference clock CK11 at time t32, and in the example shown in FIG. 10B, there is a drop-out Q22 of the reference clock CK11 at time t42.

As shown in FIG. 10A, during the time in which the target count value held in the register 42a is fixed at the value Ninit, the counter 43 repeatedly counts to the value of Ninit. The reference clock CK1 is output from the timer 25 at a fixed period. For this reason, if the noise Q21 is not superimposed onto the reference clock CK11 that is generated from the reference clock CK1, the count value C1 input to the startup control unit 51 has substantially the same value each time the reference clock CK11 is input. Specifically, in FIG. 10A the count value N1 input at time t31, the count value N3 input at time t33, and the count value N4 input at time t34 are substantially the same value.

In contrast, the count value N2 that is caused by the noise Q21 superimposed onto the reference clock CK11 and that is input at time t32 differs greatly from the count values N1, N3, and N4. For this reason, in the startup control unit 51, although the difference between the count values N1 and N2 and the different between the count values N2 and N3 are judged to be equal to or exceed the threshold, the difference between the count values N3 and N4 is judged to be smaller than the threshold. As a result, the value N4 is output to the register 42a of the synchronization circuit 26 from the startup control unit 51 and, at time t35, this is captured into the register 42b as the target count value. In this manner, even if the reference clock CK11 is input at the time of startup with the noise Q21 superimposed, it is possible to shorten the time required for startup of the field device 2.

As shown in FIG. 10B, at times t41 and t43, at which the drop-out Q22 of the reference clock CK11 does not occur, the count values of the counter 43 at the time at which the reference clock CK11 is input are input as the count values C1 to the startup control unit 51. In contrast, at time t42, at which the drop-out Q22 of the reference clock CK11 occurs, the count value C1 is not input to the startup control unit 51. For this reason, in the startup control unit 51, the judgment is made that the difference between the count value N1 input at time t41 and the count value N2 input at time t43 is smaller than the threshold.

If the difference between the count values N1 and N2 is judged to be smaller than the threshold, the value N2 is output from the startup control unit 51 to the register 42a of the synchronization circuit 26, and is captured into the register 42b at time t44 as the target count value. In this manner, even if the reference clock CK11 is input at the time of startup with a drop-out occurring, it is possible to shorten the time required for startup of the field device 2.

As described above, in the second preferred embodiment, the startup control unit 51 determines the difference between the count value C1 of the counter 43 when the reference clock CK11 is input, and the count value C1 of the counter 43 when the reference clock CK11 is next input. Then, if the difference is smaller than a pre-established threshold, sets the latter count value C1 as the target count value. For this reason, even if there is a great offset between the phases of the reference clock CK1 and the reference clock CK2 at the time of startup, it is possible to shorten the amount of time required for startup. Also, even if a reference clock with superimposed noise or a reference clock in which drop-outs occur is input to the synchronization circuit 26 at the time of startup, it is possible to shorten the time required for startup.

Furthermore, the above-described second preferred embodiment has been described by an example of a startup control unit 51 that, in controlling the startup, makes a judgment of whether or not the difference between two count values C1 obtained when the reference clock CK11 is input is smaller than a threshold. However, rather than using the startup control unit 51, three or more count values C1 may be compared, and startup control may be performed based on the comparison results. For example, in the example shown in FIG. 10A, of the count values N1, N2, and N3, although count values N1 and N3 are substantially the same, the count values N2 differs greatly from the count values N1 and N3. For this reason, startup control may be done using the count values N1 and N3, eliminating the count value N2.

Third Preferred Embodiment

Figure 11:
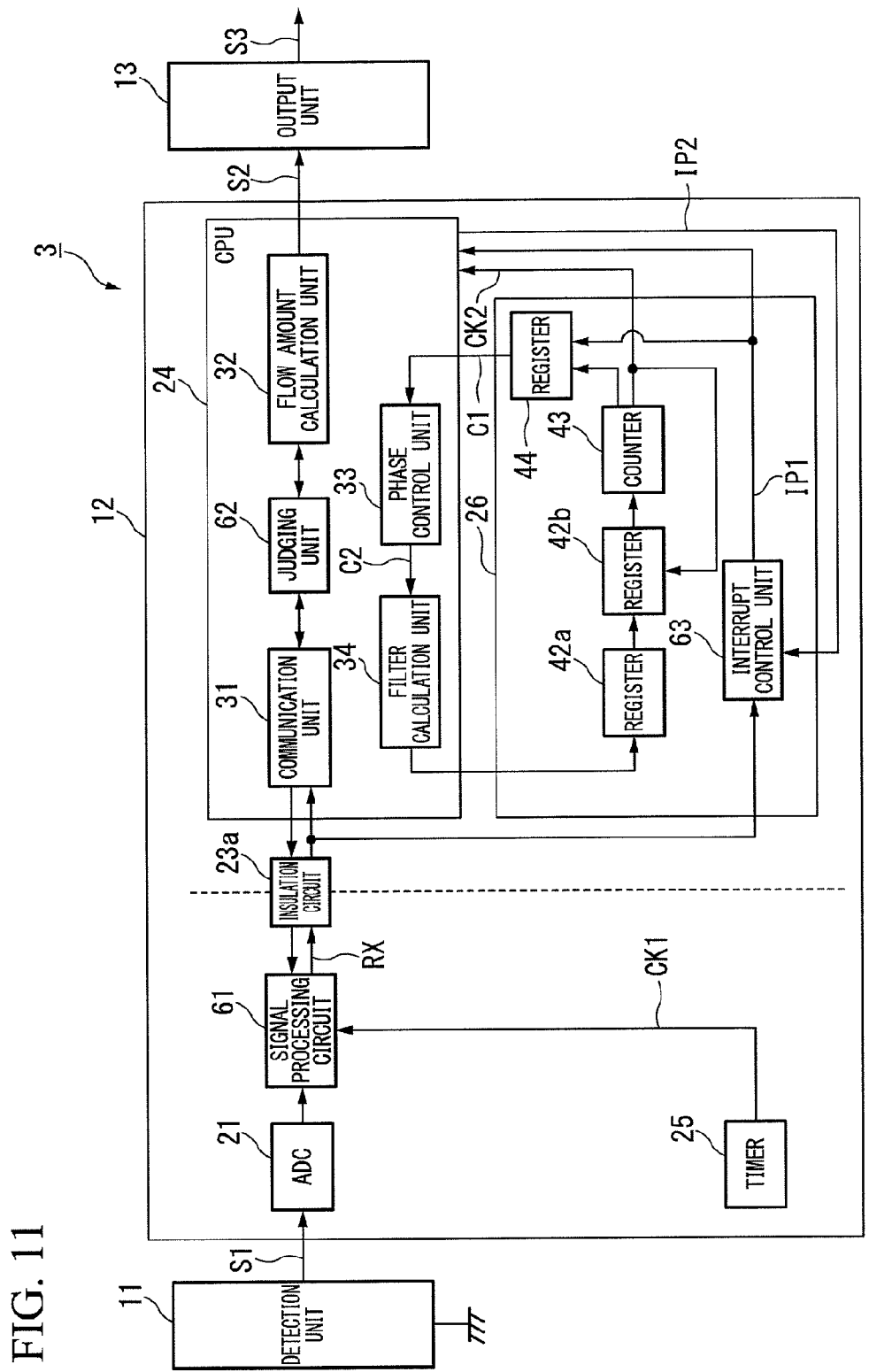
FIG. 11 is a block diagram illustrating the constitution of the main parts of a field device in accordance with the third preferred embodiment of the present invention.

FIG. 11 is a block diagram illustrating the constitution of the main parts of a field device in accordance with the third preferred embodiment of the present invention. In FIG. 11, blocks that are the same as blocks shown in FIG. 1 and FIG. 8 are assigned the same reference numerals. As shown in FIG. 11, a field device 3 of the third preferred embodiment omits the insulation circuit 23b provided in the field device 1 shown in FIG. 1, the synchronization circuit 26 being connected to a serial bus, one end of which is connected to the CPU 24 and the other end of which is connected to the insulation circuit 23a.

A field device 3, as shown in FIG. 11, has a signal processing circuit 61 and an interrupt control unit 63 in place of the signal processing circuit 22 and the interrupt control unit 41, respectively. An additional judging unit 62 is implemented in the CPU 24. The judging unit 62 is implemented by reading and execution by the CPU 24 of a program stored in a non-illustrated memory.

In the field devices 1 and 2 of the first and second preferred embodiments, the insulation circuit 23a provides insulation between the signal processing circuit 22 and the CPU 24, and the insulation circuit 23b provides insulation between the timer 25 and the synchronization circuit 26. The field device 3 in the third preferred embodiment omits the insulation circuit 23b and connects the synchronization circuit 26 to a serial bus connecting the signal processing circuit 61 provided in place of the signal processing circuit 22 and the CPU 24, thereby reducing the cost and also eliminating the number of signal lines.

The signal processing circuit 61, similar to the signal processing circuit 22 shown in FIG. 1 and FIG. 8, pre-processes the signal output from the ADC 21 necessary for determining the flow amount of the fluid, at the timing of a reference clock CK1 being input from the timer 25. Additionally, the signal processing circuit 61 generates data that indicates the timing of a reference clock CK1 from the timer 25 and that is to be transmitted to the synchronization circuit 26 (hereinafter called as synchronization data) and data that indicates the processing results of pre-processing to be transmitted to the CPU 24 (hereinafter called as pre-processing data).

Figure 12:
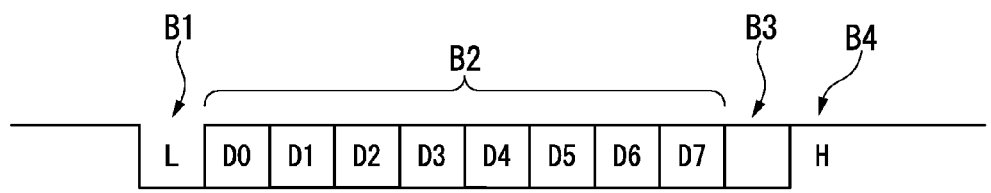
FIG. 12 is a diagram illustrating the format of data sent and accepted at the signal processing circuit in accordance with the third preferred embodiment of the present invention.

FIG. 12 is a diagram illustrating the format of data sent and accepted at the signal processing circuit in accordance with the third preferred embodiment of the present invention. As shown in FIG. 12, the signal processing circuit 61 sends and accepts data via the insulating circuit 23a in 11-bit data units of one start bit B1, eight bits of data B2, one parity bit B3, and one stop bit B4.

In this case, data sent and accepted at the signal processing circuit 61, as shown in FIG. 12, because of arrangement of the start bit B1 at the start of data, always exhibits a falling edge at the start of the data. The signal processing circuit 61 utilizes the characteristics of the start bit B1 to generate the synchronization data. Specifically, 11 bits of data having the start bit B1, the data bits B2 in which a prescribed specific value is set, the parity bit B3, and the stop bit B4 are generated.

The signal processing circuit 61 generates, as the pre-processing data to which the identification data indicating the pre-processing data is added to data indicating the results of pre-processing. Specifically, the pre-processing data is generated in which the 11 bits of identification data constituted by the start bit B1, the data bits B2 in which the specific value differing from the value set to the data bit B2 of the synchronization data is set, the parity bit B3, and the stop bit B4 are added before the data indicating the pre-processing results of the pre-processing.

Figure 13:
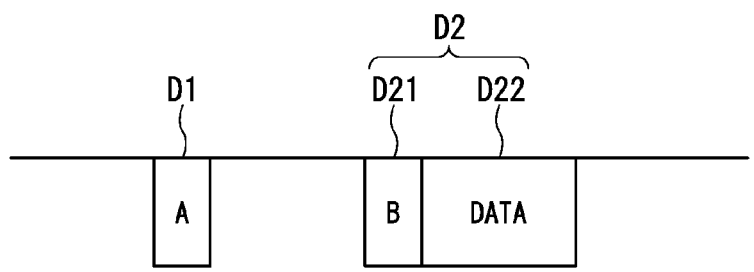
FIG. 13 is schematic representation illustrating the synchronization data and the pre-processing data transmitted from a signal processing unit in accordance with the third preferred embodiment of the present invention.

FIG. 13 is schematic representation illustrating the synchronization data and the pre-processing data transmitted from a signal processing unit in accordance with the third preferred embodiment of the present invention. In FIG. 13, as an aid to understanding, the synchronization data D1 is represented as A, and the pre-processing data D2 is represented as B and Data. In this case, the symbol B of the pre-processing data D2 represents the identification data D21 and Data represents the data D22 that indicates the processing result of the pre-processing.

The signal processing circuit 61 performs pre-processing at the timing at which the reference clock CK1 of the timer 25 is input, and transmits the synchronization data D1 (synchronization data D1 synchronized with the reference clock CK1) at the timing that lags with respect to the timing at which the reference clock CK1 is input by a certain period of time lag. Some processing time is, however, required, from the time the reference clock CK1 is input to the signal processing circuit 61 until the pre-processing is been complete, and there furthermore may be variation in this processing time. For this reason, the signal processing circuit 61 transmits the pre-processing data D2 at the timing after the reference clock CK1 has been input, at which the dispersion in the processing time has elapsed.

The judging unit 62 judges whether the data transmitted from the signal processing circuit 61 and received at the communication unit 31 is the synchronization data D1 or the pre-processing data D2. If it is judged that data received at the communication unit 31 is the pre-processing data D2, the judging unit 62 outputs to the flow amount calculation unit 32 data D22 that forms a part of the pre-processing data D2 and indicates the processing result of the pre-processing. The result of the judgment by the judging unit 62 is also used to control the output of the interrupt clear signal IP2.

The interrupt control unit 63 performs interrupt control with respect to the CPU 24, based on the synchronization data D1 from the signal processing circuit 61. Specifically, the interrupt control unit 63, at each of the timings of receiving the synchronization data D1 and the pre-processing data D2 from the signal processing circuit 61 (timing of the falling edge of the start bit B1), outputs the interrupt signal IP1 to the CPU 24. Interrupt by the reference clock CK11 is then prohibited during the period up until the interrupt clear signal IP2 is output from the CPU 24.

Figure 14:
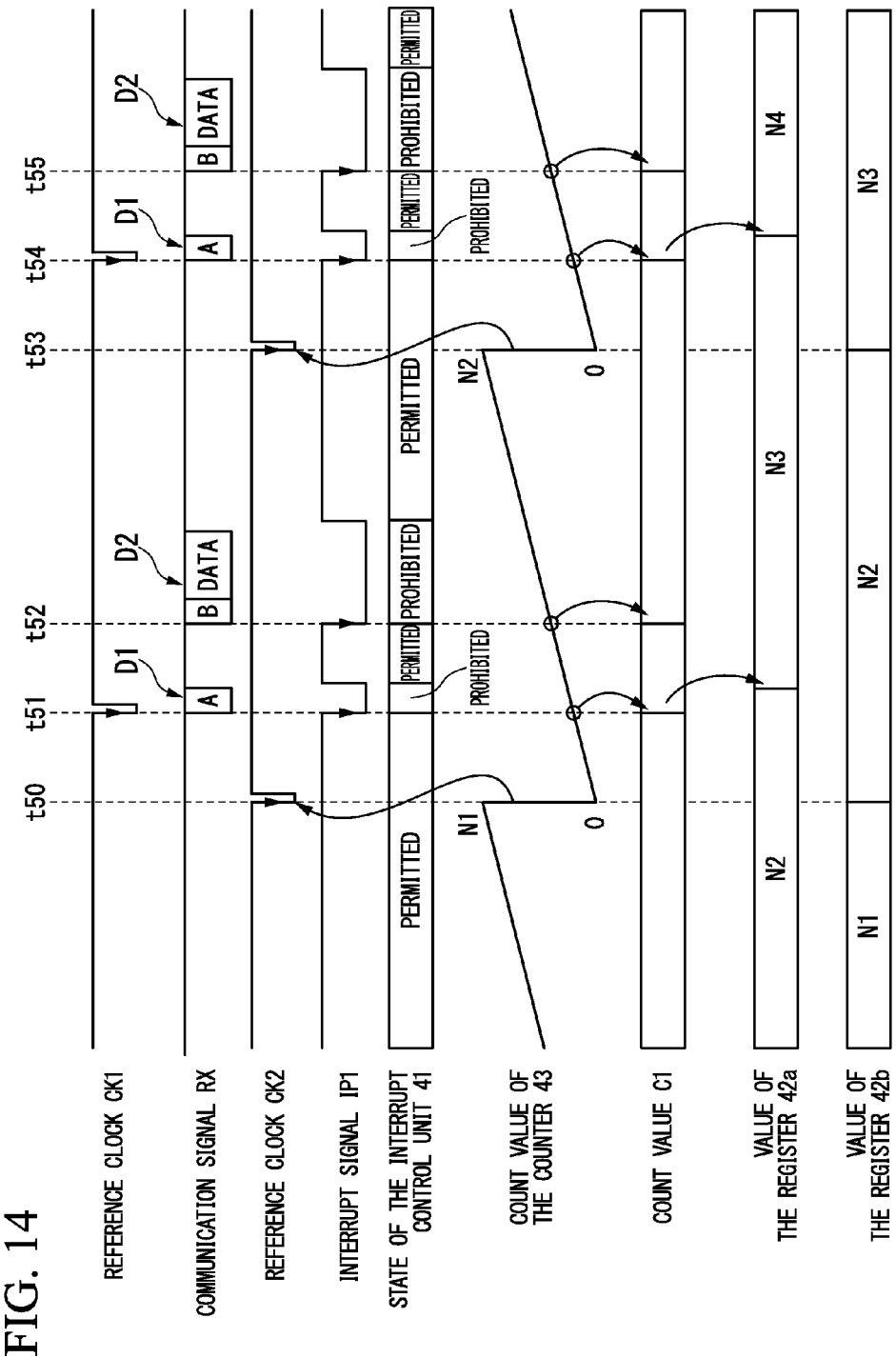
FIG. 14 is a timing diagram describing the operation of a field device in accordance with the third preferred embodiment of the present invention.

Next, the operation of the field device 3 in the above-noted constitution will be described. FIG. 14 is a timing diagram describing the operation of a field device in accordance with the third preferred embodiment of the present invention. First, similar to the first preferred embodiment, the detection unit 11 is controlled by the CPU 24 provided in the signal processing unit 12 so as to detect a fluid flowing in a pipe and, in the signal processing circuit 61, the detection signal S1 from the detection unit 11 is subjected to pre-processing at the timing of the input of the reference clock CK1 from the timer 25.

In the case, assume that the timing of the input of the reference clock CK1 to the signal processing circuit 61 is time t51 in FIG. 14. Then, the synchronization data D1 (A in FIG. 14) is transmitted from the signal processing circuit 61 as a communication signal RX and received by the communication unit 31 of the CPU 24 and an interrupt control unit 63 of the synchronization circuit 26, respectively. The communication signal RX received by the communication unit 31 of the CPU 24 is judged to be the synchronization data D1 in the judging unit 62.

When the synchronization data D1 is received by the interrupt control unit 63 of the synchronization circuit 26, the interrupt signal IP1 is output to the CPU 24 from the interrupt control unit 63, the count value of the counter 43 at the point in time when the interrupt signal IP1 is output and being held in the register 44 is output to the CPU 24 as the count value C1. When the interrupt signal IP1 is output, the interrupt control unit 63 is in the state in which interrupt is prohibited, and the CPU 24, based on the result of judgment in the judging unit 62, outputs the interrupt clear signal IP2 after completing the reception of the synchronization data D1.

When the count value C1 is input to the CPU 24 from the synchronization circuit 26, similar to the first preferred embodiment, a control value C2 responsive to the count value C1 is output from the phase control unit 33, the filtering is done of the control value C2 in the filter calculation unit 34. The value obtained by this filtering is temporarily stored in the register 42a of the synchronization circuit 26. In the example shown in FIG. 14, the value N3 is held in the register 42a.

Next, after time t51 (the time at which the synchronization data D1 is output from the signal processing circuit 61), when time t52 is reached after the elapse of the processing time for pre-processing, the pre-processing data D2 (B and Data in FIG. 14) is transmitted from the communication processing unit 61 as the communication signal RX and received at the communication unit 31 of the CPU 24 and at the interrupt control unit 63 of the synchronization circuit 26. The communication signal RX received at the communication unit 31 of the CPU 24 is output to the judging unit 62 and the signal is judged to be the pre-processing data D2, and data Data indicating the processing results of pre-processing is output to the flow amount calculation unit 32.

When the pre-processing data D2 is received at the interrupt control unit 63 of the synchronization circuit 26, an interrupt signal IP1 is output to the CPU 24 from the interrupt control unit 63, and the count value of the counter 43 at the time at which the interrupt signal IP1 is output is held in the register 44 and output to the CPU 24 as the count value C1. When the interrupt signal IP1 is output, the interrupt control unit 63 goes into the state that prohibits an interrupt, and the CPU 24, based on the judgment result in the judging unit 62, outputs the interrupt clear signal IP2 after completing reception of the pre-processing data D2.

In this case, similar to the case in which the synchronization data D1 is input to the synchronization circuit 26, when the pre-processing data D2 is input to the synchronization circuit 26, the count value C1 from the synchronization circuit 26 (count value at time t52) is input to the CPU 24. However, because the communication signal RX received at time t52 is judged by the judging unit 62 of the CPU 24 to be pre-processing data D2, the control value C2 (control value C2 responsive to the count value C1 output from the synchronization circuit 26 at time t52) is not output from the phase control unit 33.

If we assume that, at time t53, the counter 43 completes counting up to the target count value (the value N2 in the example shown in FIG. 14) stored in the register 42b, the reference clock CK2 is output to the CPU 24 from the counter 43. When the reference clock CK2 is input to the CPU 24, post-processing is performed by the flow amount calculation unit 32 to determine the flow amount of a fluid, and the flow amount signal S2 is output to the output unit 13 from the flow amount calculation unit 32. The flow amount signal S2 is converted to an analog signal in the output unit 13, and is output as the measurement signal S3 to the analog transmission line.

When the reference clock CK2 is output from the counter 43, the value held in the register 42a (the value N3 in the example shown in FIG. 14) is captured by and held in the register 42b. The count value of the counter 43 is then cleared, and the counter 43 starts the operation of counting to the target count value N3 held in the register 42b. Thereafter, similar to the first preferred embodiment, by repeated control in the synchronization circuit 26 to adjust the period of the reference clock CK2, the phase of the reference clock CK2 gradually approaches the phase of the reference clock CK11.

As described above, in the third preferred embodiment, the difference in phase between the synchronization data D1 output from the signal processing circuit 61 and the reference clock CK2 at the timing of the reference clock CK1 is determined from the count value of the counter 43, and a control value C2 for controlling this phase difference is generated by the phase control unit 33, lowpass filtering being performed of the control value C2 in the filter calculation unit 34 so as to determine the target count value of the counter 43 (the value that governs the timing of the output of the reference clock CK2). For this reason, it is possible to synchronize the signal processing circuit 61, the timing of the pre-processing of which is governed by the reference clock CK1, and the flow amount calculation unit 32, the timing of the post-processing of which is governed by the reference clock CK2 with high accuracy.

In the third preferred embodiment, in addition to omitting the insulation circuit 23b that is provided in the field device 1 shown in FIG. 1, the synchronization circuit 26 is connected to a serial bus that connects the CPU 24 and the insulation circuit 23a, and the synchronization data D1 and pre-processing data D2 are transmitted from the signal processing circuit 61 to the CPU 24 and the synchronization circuit 26 via the insulation circuit 23a. As a result, it is possible to reduce the cost and also reduce the number of signal lines.

First Variation Example

Figure 15:
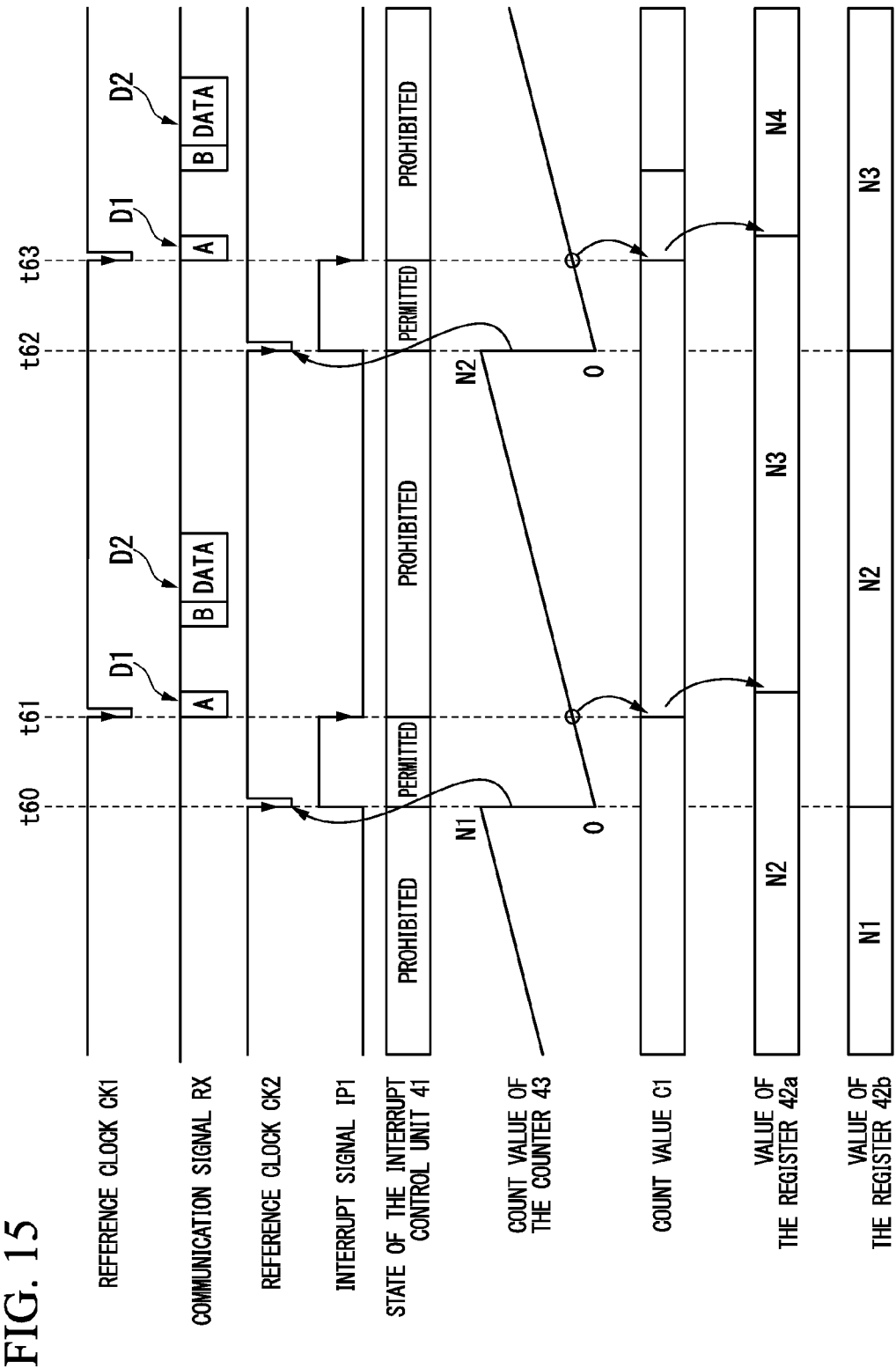
FIG. 15 is a timing diagram describing the first variation example of the field device in accordance with the third preferred embodiment of the present invention.

FIG. 15 is a timing diagram describing the first variation example of the field device in accordance with the third preferred embodiment of the present invention. In the above-described field device 3 of the third preferred embodiment, when the synchronization data D1 transmitted from the signal processing circuit 61 is received, and also when the pre-processing data D2 is received, an interrupt signal IP1 is output to the CPU 24 from the interrupt control unit 63 of the synchronization circuit 26. If many interrupts to the CPU 24 occur, the load increases, leading to a reduction in the processing capacity of the CPU 24. The first variation example reduces the interrupts to the CPU 24, and prevents a reduction in the processing capacity of the CPU 24.

Specifically, in the first variation example, the phase of the reference clock CK2 is advanced relative to the reference clock CK1, and by permitting an interrupt when the reference clock CK2 is input and by prohibiting an interrupt when the synchronization data D1 (A in FIG. 14) is input, the interrupts to the CPU 24 are reduced. That is, a phase control unit having the input/output relationship such as shown in FIG. 6A is used as the phase control unit 33 and, similar to the second variation example of the first preferred embodiment described using FIG. 6B, the phase of the reference clock CK2 is caused to lead relative to the reference clock CK1. Then, in place of the interrupt clear signal IP2 output from the CPU 24, the reference clock CK2 is input to the interrupt control unit 63.

By doing this, as shown in FIG. 15, when the synchronization data D1 from the signal processing circuit 61 is received by the interrupt control unit 63 of the synchronization circuit 26 at time t61, the interrupt signal IP1 is output to the CPU 24 from the interrupt control unit 63, which goes into the state that prohibits interrupts to the CPU 24. As a result, even if the pre-processing signal D2 (B and Data in FIG. 15) from the signal processing circuit 61 is received at the interrupt control unit 63 of the synchronization circuit 26, an interrupt signal IP1 is not output from the interrupt control unit 63 to the CPU 24. Then, at the subsequent time t62, when the reference clock CK2 is output from the synchronization circuit 26, the interrupt control unit 63 goes into the state that permits an interrupt.

In this case, if the phase of the reference clock CK2 excessively leads the reference clock CK1, the timing of the pre-processing data from the signal processing circuit 61 (or, precisely, the data Data that indicates the processing results of the pre-processing) being input to the flow amount calculation unit 32 overlaps with the timing of the output of the reference clock CK2 from the synchronization circuit 26, so that a normal calculation might not be made. For this reason, with respect to the reference clock CK1, the phase of the reference clock CK2 must be adjusted to within a range in that it does not overlap with the timing of the input of the pre-processing data D2 from the signal processing circuit 61 to the flow amount calculation unit 32.

Second Variation Example

Figure 16:
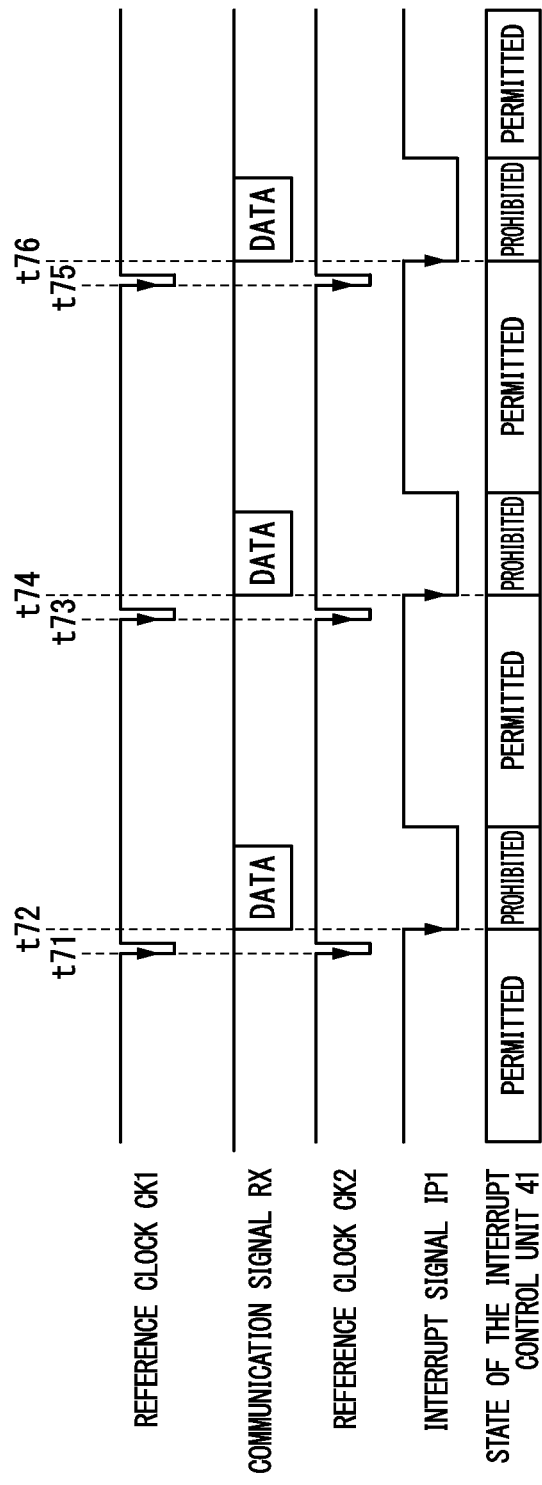
FIG. 16 is a timing diagram describing the second variation example of the field device in accordance with the third preferred embodiment of the present invention.

FIG. 16 is a timing diagram describing the second variation example of the field device in accordance with the third preferred embodiment of the present invention. In the above-described field device 3 in accordance with the preferred embodiment, the synchronization data D1 is transmitted from the signal processing circuit 61 to the CPU 24 and the synchronization circuit 26 at a fixed time interval. If the dispersion in the processing time in the signal processing circuit 61 is sufficiently small, the synchronization data D1 is not required. In the second variation example, the synchronization data D1 and the identification data D21 of the pre-processing data D2 are omitted, and only the data Data that indicates the processing results of pre-processing is transmitted from the signal processing circuit 61 to the CPU 24 and the synchronization circuit 26.

As shown in FIG. 16, the signal processing circuit 61 transmits the data Data indicating the processing results of pre-processing at a timing (times t72, t74, and t76) that lags by a fixed amount of time required for pre-processing after the timing of the input of the reference clock CK1 (times t71, t73, and t75). Then, at the timings of the reception of the data Data indicating the processing results of the pre-processing (timings of the falling edges of the start bit B1), the interrupt control unit 63 outputs to the CPU 24 the interrupt signal IP1. In the second variation example, the judging unit 62 is omitted from FIG. 11.

Although the above has been a description of a synchronization apparatus and a field device in accordance with preferred embodiments of the present invention, the present invention is not restricted to the above-described preferred embodiments, and can be freely modified within the scope thereof. For example, in the above-described first to third preferred embodiments, the example of a counter 43 provided in the synchronization circuit 26 that is an up-counter that sequentially increments the count value from the initial value of zero and counts up to at a target count value is presented. The counter 43, however, may be a down-counter having the target count value as the initial value and that sequentially decrements the count value down to the value of zero.

If a down-counter is used as the counter 43, it is necessary to use as the phase control unit 33 one that has an input/output relationship in which the horizontal axis shown in FIG. 2 is inverted. That is, it is necessary to have a phase control unit wherein although when the count value C1 output from the synchronization circuit 26 is 0 and k, the point at which it is k is the same as shown in FIG. 2, but wherein within the range in which the count value C1 is between zero and k/2, the control value C2 is output that gradually decreases as the count value C1 becomes larger, and wherein within the range in which the count value C1 is between k and k/2, the control value C2 is output that gradually increases as the count value C1 becomes smaller.

Also, the above-noted first to third preferred embodiments have been described for the example in which one signal processing circuit 22 (signal processing circuit 61), the pre-processing timing of which is governed by the reference clock CK1 and one flow amount calculation unit 32, the post-processing timing of which is governed by the reference clock CK2, which are connected via the insulation circuit 23a are synchronized. However, the present invention may have a plurality of flow calculation units 32 connected in parallel to one signal processing circuit 22 (signal processing circuit 61), so as to synchronize a signal processing circuit 22 (signal processing circuit 61) with a plurality of flow amount calculation units 32.

The above-noted preferred embodiments have been described for the case in which the phase control unit 33 and the filter calculation unit 34 are implemented in a software manner by execution of a program by the CPU 24. The phase control unit 33 and the filter calculation unit 34, however, may be implemented by hardware within the synchronization circuit 26.

Additionally, the above-described preferred embodiments have been described for the example in which the signal processing circuit 22 (signal processing circuit 61) and the flow amount calculation unit 32 provided in a field device are synchronized. However, the synchronization apparatus of the present invention is not restricted to the case of synchronizing the signal processing circuit 22 (signal processing circuit 61) and the flow amount calculation unit 32 provided in the field device, and can be applied generally to a case in which a first processing unit pre-processing an input signal and a second processing unit post-processing a signal from the first processing signal are synchronized. In this case, the first and second processing units may be connected via the an insulation circuit such as in the above-described preferred embodiments, or may alternatively may be connected via a connection line such as a transmission line on which superimposition of noise and signal drop-outs can occur.

The present invention provides a synchronization apparatus capable of high accuracy synchronization of a plurality of processing units that are mutually connected, and a field device that has the apparatus.

According to the preferred embodiments of the present invention, because a control value for the purpose of controlling the phase difference of the second reference signal with respect to the first reference signal is generated by a phase control unit in accordance with the count value of the counting unit that indicates the phase difference between the first reference signal and the second reference signal, and filtering of the control value being performed by the filter unit so as to determine the target count value that is to be set in the counting unit and to adjust the phase difference of the second reference signal with respect to the first reference signal, even if noise intrudes into the first reference signal or drop-out occurs, it is possible to synchronize the first and second processing units, which are mutually connected, with high accuracy.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A synchronization apparatus synchronizing an operation of a first processing unit that performs a pre-processing on an input signal and an operation of a second processing unit that performs a post-processing on a signal from the first processing unit, the synchronization apparatus comprising:
   a counting unit configured to operate with a period that is sufficiently shorter than a period of a first reference signal that governs a timing of the pre-processing in the first processing unit, and outputting, when it has counted a target count value that has been set, a second reference signal that governs a timing of the post-processing in the second processing unit;

a phase control unit configured to generate a control value for controlling a phase difference of the second reference signal with respect to the first reference signal in accordance with a count value of the counting unit when the first reference signal is input;

a filter unit configured to filter the control value that has been generated by the phase control unit so as to determine the target count value to be set in the counting unit; and a startup control unit that, when a difference between a first count value, which is a count value of the counting unit when the first reference signal is input, and a second count value, which is a count value of the count unit when the first reference signal is next input, is smaller than a pre-established threshold, sets the second count value to the target count value of the counting unit.

2. The synchronization apparatus according to claim 1, wherein the filter unit determines, as the target count value to be set in the counting unit, a value that causes the phase difference of the second reference signal with respect to the first reference signal to gradually approach to a pre-established phase difference.

3. The synchronization apparatus according to claim 1, further comprising:

a first insulation circuit configured to electrically insulate between the first processing unit and the second processing unit; and a second insulating circuit configured to electrically insulate between a generation circuit generating the first reference signal and the synchronization apparatus.

4. The synchronization apparatus according to claim 3, wherein the first insulation circuit and the second insulating circuit share a common circuit.

5. The synchronization apparatus according to claim 3, wherein the first insulation circuit and the second insulating circuit are separated.

6. The synchronization apparatus according to claim 1, wherein
the synchronization apparatus is connected to a connection line that connects the first processing unit and the second processing unit, and
the first processing unit, when the first reference signal is input, transmits pre-established synchronization data to the synchronization apparatus via the connection line.

7. A field device having a detection unit configured to detect a physical quantity, performing signal process with respect to a detection signal output from the detection unit, and determining the physical quantity detected by the detection unit; the field device comprising:

a first processing unit configured to perform a pre-processing on the detected signal output from the detection unit;

a second processing unit configured to perform a post-processing on a signal from the first processing unit;

a synchronization apparatus synchronizing an operation of the first processing unit and an operation of the second processing unit, the synchronization apparatus including:

a counting unit configured to operate with a period that is sufficiently shorter than a period of a first reference signal that governs a timing of the pre-processing in the first processing unit, and outputting, when it has counted a target count value that has been set, a second reference signal that governs a timing of the post-processing in the second processing unit;

a phase control unit configured to generate a control value for controlling a phase difference of the second reference signal with respect to the first reference signal in accordance with a count value of the counting unit when the first reference signal is input; and a filter unit configured to filter the control value that has been generated by the phase control unit so as to determine the target count value to be set in the counting unit; and a startup control unit that, when a difference between a first count value, which is a count value of the count unit when the first reference signal is input, and a second count value, which is a count value of the counting unit when the first reference signal is next input, is smaller than a pre-established threshold, sets the second count value to the target count value of the counting unit.

8. The field device according to claim 7, wherein the filter unit determines, as the target count value to be set in the counting unit, a value that causes the phase difference of the second reference signal with respect to the first reference signal to gradually approach to a pre-established phase difference.

9. The field device according to claim 7, further comprising:

a first insulation circuit configured to electrically insulate between the first processing unit and the second processing unit; and a second insulating circuit configured to electrically insulate between a generation circuit generating the first reference signal and the synchronization apparatus.

10. The field device according to claim 9, wherein
the first insulation circuit and the second insulating circuit share a common circuit.

11. The field device according to claim 9, wherein
the first insulation circuit and the second insulating circuit are separated.

12. The field device according to claim 9, further comprising the generation circuit.

13. The field device according to claim 7, wherein
the synchronization apparatus is connected to a connection line that connects the first processing unit and the second processing unit, and
the first processing unit, when the first reference signal is input, transmits pre-established synchronization data to the synchronization apparatus via the connection line.

14. A synchronization method for synchronizing an operation of a first processing unit that performs a pre-processing on an input signal and an operation of a second processing unit that performs a post-processing on a signal from the first processing unit, the synchronization method comprising:

operating with a period that is sufficiently shorter than a period of a first reference signal that governs a timing of the pre-processing in the first processing unit, and outputting, when counting a target count value that has been set, a second reference signal that governs a timing of the post-processing in the second processing unit;

generating a control value for controlling a phase difference of the second reference signal with respect to the first reference signal in accordance with a count value when the first reference signal is input;

filtering the control value that has been generated so as to determine the target count value to be set; and when a difference between a first count value, which is a count value when the first reference signal is input, and a second count value, which is a count value when the first reference signal is next input, is smaller than a pre-established threshold, setting the second count value to the target count value.

15. The synchronization method according to claim 14, further comprising:
    determining, as the target count value to be set, a value that causes the phase difference of the second reference signal with respect to the first reference signal to gradually approach to a pre-established phase difference.

16. The synchronization method according to claim 14, wherein
    the first processing unit and the second processing unit are electrically insulated, and
    a generation circuit generating the first reference signal and a synchronization apparatus are electrically insulated.

17. The synchronization method according to claim 14, further comprising:
    when the first reference signal is input, transmitting pre-established synchronization data via a connection line that connects the first processing unit and the second processing unit.

* * * * *